US012795322B2

(12) United States Patent
Eronen et al.

(10) Patent No.: US 12,795,322 B2
(45) Date of Patent: Nov. 10, 2026

(54) RENDERING REVERBERATION

(71) Applicant: Nokia Technologies Oy, Espoo (FI)

(72) Inventors: Antti Johannes Eronen, Tampere (FI); Jussi Artturi Leppanen, Tampere (FI); Mikko Gynther, Helsinki (FI); Pasi Liimatainen, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 281 days.

(21) Appl. No.: 18/287,567

(22) PCT Filed: Apr. 1, 2022

(86) PCT No.: PCT/FI2022/050212
§ 371 (c)(1),
(2) Date: Oct. 19, 2023

(87) PCT Pub. No.: WO2022/223874
PCT Pub. Date: Oct. 27, 2022

(65) Prior Publication Data

US 2024/0196159 A1 Jun. 13, 2024

(30) Foreign Application Priority Data

Apr. 20, 2021 (GB) ..................................... 2105632

(51) Int. Cl.
*H04S 7/00* (2006.01)

(52) U.S. Cl.
CPC .............. *H04S 7/306* (2013.01); *H04S 7/304* (2013.01); *H04S 2400/11* (2013.01); *H04S 2420/01* (2013.01)

(58) Field of Classification Search
CPC ...... H04S 7/306; H04S 7/304; H04S 2400/11; H04S 2420/01
See application file for complete search history.

(56) References Cited

U.S. PATENT DOCUMENTS 8,767,968 B2 7/2014 Flaks et al.
2016/0255453 A1* 9/2016 Fueg ......................... H04S 7/30 381/1

(Continued)

FOREIGN PATENT DOCUMENTS

| | | | |
|---|---|---|---|
| EP | 3699905 | A1 | 8/2020 |
| GB | 2575510 | A | 1/2020 |
| WO | WO-2019/197709 | A1 | 10/2019 |

OTHER PUBLICATIONS

Convenor, ISO/IEC JTC 1/SC 29/WG 11, Draft MPEG-I 6DoF Audio Encoder Input Format, Jul. 3, 2020, 33 pgs.

(Continued)

*Primary Examiner* — Daniel R Sellers
(74) *Attorney, Agent, or Firm* — McCarter & English, LLP

(57) ABSTRACT

An apparatus for processing at least one immersive audio signal, the immersive audio signal including at least one audio signal associated with a sound source, at least one sound source parameter defining the sound source and at least one scene parameter for acoustically defining a scene within which the sound source is located, the apparatus including circuitry configured to: obtain the audio signal associated with the sound source; obtain the sound source parameter defining the sound source; obtain the scene parameter for acoustically defining the scene within which the sound source is located; determine information, for the sound source, about a propagation delay; and process the audio signal based on the information, wherein the circuitry configured to process the audio signal is configured to: determine at least one early reverberation parameter; and render the audio signal based on the early reverberation parameter.

19 Claims, 12 Drawing Sheets

(56) References Cited

U.S. PATENT DOCUMENTS

| | | | | |
|---|---|---|---|---|
| 2019/0373395 | A1* | 12/2019 | Sarkar | H04S 7/304 |
| 2020/0304935 | A1* | 9/2020 | Peters | G06F 3/167 |
| 2021/0195363 | A1* | 6/2021 | Honma | G10K 15/12 |
| 2021/0352425 | A1* | 11/2021 | Pang | H04S 3/004 |
| 2023/0100071 | A1* | 3/2023 | Eronen | H04S 7/305<br>381/303 |

OTHER PUBLICATIONS

Convenor, ISO/IEC JTC 1/SC 29/WG 11, "Draft MPEG-I 6DoF Audio Encoder Input Format," Coding of Moving Pictures and Audio, International Organisation for Standardisation, MPEG 2020/ N19409, Geneva, CH, Jul. 3, 2020.

Audio Subgroup, "MPEG-I Audio Architecture and Requirements," International Organisation for Standardisation, ISO/IEC JTC1/SC29/ WG11, Coding of Moving Pictures and Audio, MPEG2019/ N18158, Marrakech, Morocco, Jan. 2019.

* cited by examiner

RENDERING REVERBERATION

CROSS REFERENCE TO RELATED APPLICATION

This patent application is a U.S. National Stage application of International Patent Application Number PCT/FI2022/050212 filed Apr. 1, 2022, which is hereby incorporated by reference in its entirety, and claims priority to GB 2105632.0 filed Apr. 20, 2021.

FIELD

The present application relates to apparatus and methods for spatial audio rendering of reverberation, but not exclusively for spatial audio rendering of reverberation in augmented reality and/or virtual reality apparatus.

BACKGROUND

Immersive audio codecs are being implemented supporting a multitude of operating points ranging from a low bit rate operation to transparency. One example of which is MPEG-I (MPEG Immersive audio). Developments of these codecs involve developing apparatus and methods for parameterizing and rendering audio scenes comprising audio elements such as objects, channels, parametric spatial audio and higher-order ambisonics (HOA), and audio scene information containing geometry, dimensions, acoustic materials, and object properties such as directivity and spatial extent. In addition, there can be various metadata which enable conveying the artistic intent, that is, how the rendering should be controlled and/or modified as the user moves in the scene.

MPEG-I Immersive Audio standard (MPEG-I Audio Phase 2 6DoF) will support audio rendering for virtual reality (VR) and augmented reality (AR) applications. The standard will be based on MPEG-H 3D Audio, which supports three degrees of freedom (3DoF) based rendering of object, channel, and HOA content. The audio renderer should be able to render virtual acoustics effects such as reverberation, sound source directivity, medium absorption, and acoustic material attenuation according to acoustic parameters defined as the encoder input or provided to the renderer. Acoustic parameters include, for example, the reverberation times (RT60), diffuse-to-direct ratio, absorption coefficients or the amount of reflected energy for acoustic materials, and (virtual or physical) room dimensions.

Room acoustics are often modelled with individually synthesized early reflection portion and a statistical model for the diffuse late reverberation. FIG. 1 depicts an example of a synthesized room impulse response where the direct sound 101 is followed by discrete early reflections 103 which have a direction of arrival (DOA) and diffuse late reverberation 105 which can be synthesized without any specific direction of arrival.

In a typical 6DoF rendering scenario, when the user or the source moves, the sound propagation path length changes dynamically. To render this smoothly in a virtual acoustics renderer such as the MPEG-I renderer a delay line with time-varying fractional delay can be used to implement this dynamic path delay. The delay d1(*t*) 102 in FIG. 1 can be seen to denote the direct sound arrival delay from the source to the listener.

Similarly with respect to early reflections the propagation delay can be calculated or updated constantly based on source-to-material-to-listener distance estimates, where there can be up to N material reflections in between for Nt order reflections. The delay d2(*t*) 104 in FIG. 1 at each point of time can denote the delay from the source to the listener for one of the early reflections (in this case the first arriving reflection).

The arrival delays, directions, and levels (amplitudes) of early reflections can be calculated with the help of image sources mirrored against reflecting elements in the virtual scene geometry. One or more early reflection paths can be traced from the source to the listener, via one or more reflecting elements. The delay of an early reflection can be determined based on the distance travelled by a sound reflection. The level of an early reflection can be determined by applying the air absorption and material absorption along the travel path of a reflection. The DOA of an early reflection can be determined as the direction of arrival of the reflection sound ray to the listening position.

The so-called Doppler effect is caused by the audible pitch shift caused by the time varying delay and it is a desired physical acoustic phenomenon and should be implemented within an audio renderer.

SUMMARY

There is provided according to a first aspect an apparatus for processing at least one immersive audio signal, the at least one immersive audio signal comprising at least one audio signal associated with a sound source, at least one sound source parameter defining the sound source and at least one scene parameter for acoustically defining a scene within which the sound source is located, the apparatus comprising means configured to: obtain the at least one audio signal associated with the sound source; obtain the at least one sound source parameter defining the sound source; obtain the at least one scene parameter for acoustically defining the scene within which the sound source is located; determine information, for the sound source, about a propagation delay; and process the at least one audio signal based on the information, wherein the means configured to process the at least one audio signal is configured to: determine at least one early reverberation parameter; and render the at least one audio signal based on the at least one early reverberation parameter.

The information, for the sound source, about a propagation delay may comprise at least one of: information indicating, for the sound source, about the propagation delay; and a propagation delay value.

The apparatus may be configured to determine a control of propagation delay processing based on the information, for the sound source, about the propagation delay.

The means configured to determine the control of propagation delay processing based on the information, for the sound source, about the propagation delay may be further configured to control processing the propagation delay for the at least one audio signal based on the determined control of propagation delay processing.

The means configured to render the at least one audio signal may be configured to: disable early reverberation based processing of the at least one audio signal; and enable late reverberation based processing of the at least one audio signal, wherein the late reverberation based processing of the at least one audio signal may comprise an enabled startup phase.

The means configured to enable the late reverberation based processing of the at least one audio signal, comprising the enabled startup phase may be configured to: obtain a dimension of the scene based on the at least one scene parameter; determine at least one time delay for at least one reflection path based on the dimension of the scene; and generate reverberation audio signals based on the application of the at least one time delay to at least part of the at least one audio signal associated with the sound source.

The means configured to render the at least one audio signal may be configured to: enable early reverberation based processing of the at least one audio signal based on the at least one early reverberation parameter using a static propagation delay value, a static sound level value and a static direction of arrival value; and enable late reverberation based processing of the at least one audio signal.

The means configured to enable early reverberation based processing of the at least one audio signal based on the at least one early reverberation parameter using the static propagation delay value, the static sound level value and the static direction of arrival value may be configured to: determine a position of the sound source based on the at least one sound source parameter; obtain a dimension of the scene based on the at least one scene parameter; determine the static time delay value, the static sound level value and the static direction of arrival value for a reflection path based on the dimension of the scene and the position of the sound source; and generate early reverberation audio signals based on the application of the static time delay value, the static sound level value and the static direction of arrival value to at least part of the at least one audio signal associated with the sound source.

The means configured to render the at least one audio signal may be configured to: enable early reverberation based processing of the at least one audio signal based on the at least one early reverberation parameter using a static propagation delay value, a static sound level value and a time varying direction of arrival value; and enable late reverberation based processing of the at least one audio signal.

The means configured to enable early reverberation based processing of the at least one audio signal may be configured to: determine a static position of the sound source based on the at least one sound source parameter, and a time-varying position of the sound source based on the at least one sound source parameter and/or time-varying position of a listener; obtain a dimension of the scene based on the at least one scene parameter; determine the static time delay value, and the static sound level value for a reflection path based on the dimension of the scene and the static position of the sound source; determine the time-varying direction of arrival value for a reflection path based on the dimension of the scene and the time-varying position of the sound source and/or time-varying position of the listener; and generate early reverberation audio signals based on the application of the static time delay value, the static sound level value and the time-varying direction of arrival value to at least part of the at least one audio signal associated with the sound source.

The means configured to render the at least one audio signal may be configured to: enable early reverberation based processing of the at least one audio signal based on the at least one early reverberation parameter using a time-varying propagation delay value, a time-varying sound level value and time-varying direction of arrival value; and enable late reverberation based processing of the at least one audio signal.

The means configured to enable early reverberation based processing of the at least one audio signal may be configured to: determine a time-varying position of the sound source based on the at least one sound source parameter and or time-varying position of a listener; obtain a dimension of the scene based on the at least one scene parameter; determine the time-varying time delay value, the time-varying sound level value, and the time-varying direction of arrival value for a reflection path based on the dimension of the scene and the time-varying position of the sound source and/or time-varying position of the listener; generate early reverberation audio signals based on the application of the time-varying time delay value, the time-varying sound level value and the time-varying direction of arrival value to at least part of the at least one audio signal associated with the sound source; and further phase modifying the early reverberation audio signals.

The means configured to further phase modify the early reverberation audio signals may be configured to decorrelate process the early reverberation audio signals.

The means configured to obtain the at least one scene parameter for acoustically defining the scene within which the sound source is located may be configured to obtain at least one of: at least one scene geometry parameter; and at least one scene acoustic material parameter.

The means configured to obtain the at least one scene parameter for acoustically defining the scene within which the sound source is located may be configured to obtain the at least one scene parameter from at least one of: an encoder input format description; a content creator; an augmented reality sensing apparatus; a camera; and a light ranging and detection sensor.

The means configured to determine information indicating, for the sound source, about the propagation delay may be configured to determine at least one of: information indicating, for the sound source, a disabling of dynamic source updating; a flag within the at least one immersive audio signal indicating a disabling of dynamic source updating; information within the application programming interface indicating a disabling of dynamic source updating for the audio source; and a quality determiner configured to determine a lowering of quality of an output audio signal when the audio source is processed with dynamic source updating.

The means configured to determine information indicating, for the sound source, about the propagation delay may be configured to determine information indicating, for the sound source a disabling of time-varying propagation delay.

According to a second aspect there is provided a method for processing at least one immersive audio signal, the at least one immersive audio signal comprising at least one audio signal associated with a sound source, at least one sound source parameter defining the sound source and at least one scene parameter for acoustically defining a scene within which the sound source is located, the method comprising: obtaining the at least one audio signal associated with the sound source; obtaining the at least one sound source parameter defining the sound source; obtaining the at least one scene parameter for acoustically defining the scene within which the sound source is located; determining information, for the sound source, about a propagation delay; and processing the at least one audio signal based on the information, wherein processing the at least one audio signal comprises: determining at least one early reverberation parameter; and rendering the at least one audio signal based on the at least one early reverberation parameter.

The information, for the sound source, about a propagation delay may comprise at least one of: information indicating, for the sound source, about the propagation delay; and a propagation delay value.

The method may further comprise determining a control of propagation delay processing based on the information, for the sound source, about the propagation delay.

Determining the control of propagation delay processing based on the information, for the sound source, about the propagation delay may further comprise controlling processing the propagation delay for the at least one audio signal based on the determined control of propagation delay processing.

Rendering the at least one audio signal may comprise: disabling early reverberation based processing of the at least one audio signal; and enabling late reverberation based processing of the at least one audio signal, wherein the late reverberation based processing of the at least one audio signal may comprise an enabled startup phase.

Enabling the late reverberation based processing of the at least one audio signal, comprising the enabled startup phase may comprise: obtaining a dimension of the scene based on the at least one scene parameter; determining at least one time delay for at least one reflection path based on the dimension of the scene; and generating reverberation audio signals based on the application of the at least one time delay to at least part of the at least one audio signal associated with the sound source.

Rendering the at least one audio signal may comprise: enabling early reverberation based processing of the at least one audio signal based on the at least one early reverberation parameter using a static propagation delay value, a static sound level value and a static direction of arrival value; and enabling late reverberation based processing of the at least one audio signal.

Enabling early reverberation based processing of the at least one audio signal based on the at least one early reverberation parameter using the static propagation delay value, the static sound level value and the static direction of arrival value may comprise: determining a position of the sound source based on the at least one sound source parameter; obtaining a dimension of the scene based on the at least one scene parameter; determining the static time delay value, the static sound level value and the static direction of arrival value for a reflection path based on the dimension of the scene and the position of the sound source; and generating early reverberation audio signals based on the application of the static time delay value, the static sound level value and the static direction of arrival value to at least part of the at least one audio signal associated with the sound source.

Rendering the at least one audio signal may comprise: enabling early reverberation based processing of the at least one audio signal based on the at least one early reverberation parameter using a static propagation delay value, a static sound level value and a time varying direction of arrival value; and enabling late reverberation based processing of the at least one audio signal.

Enabling early reverberation based processing of the at least one audio signal may comprise: determining a static position of the sound source based on the at least one sound source parameter, and a time-varying position of the sound source based on the at least one sound source parameter and/or time-varying position of a listener; obtaining a dimension of the scene based on the at least one scene parameter; determining the static time delay value, and the static sound level value for a reflection path based on the dimension of the scene and the static position of the sound source; determining the time-varying direction of arrival value for a reflection path based on the dimension of the scene and the time-varying position of the sound source and/or time-varying position of the listener; and generating early reverberation audio signals based on the application of the static time delay value, the static sound level value and the time-varying direction of arrival value to at least part of the at least one audio signal associated with the sound source.

Rendering the at least one audio signal may comprise: enabling early reverberation based processing of the at least one audio signal based on the at least one early reverberation parameter using a time-varying propagation delay value, a time-varying sound level value and time-varying direction of arrival value; and enabling late reverberation based processing of the at least one audio signal.

Enabling early reverberation based processing of the at least one audio signal may comprise: determining a time-varying position of the sound source based on the at least one sound source parameter and or time-varying position of a listener; obtaining a dimension of the scene based on the at least one scene parameter; determining the time-varying time delay value, the time-varying sound level value, and the time-varying direction of arrival value for a reflection path based on the dimension of the scene and the time-varying position of the sound source and/or time-varying position of the listener; generating early reverberation audio signals based on the application of the time-varying time delay value, the time-varying sound level value and the time-varying direction of arrival value to at least part of the at least one audio signal associated with the sound source; and further phase modifying the early reverberation audio signals.

Further phase modifying the early reverberation audio signals may comprise decorrelate processing the early reverberation audio signals.

Obtaining the at least one scene parameter for acoustically defining the scene within which the sound source is located may comprise obtaining at least one of: at least one scene geometry parameter; and at least one scene acoustic material parameter.

Obtaining the at least one scene parameter for acoustically defining the scene within which the sound source is located may comprise obtaining the at least one scene parameter from at least one of: an encoder input format description; a content creator; an augmented reality sensing apparatus; a camera; and a light ranging and detection sensor.

Determining information indicating, for the sound source, about the propagation delay may comprise determining at least one of: information indicating, for the sound source, a disabling of dynamic source updating; a flag within the at least one immersive audio signal indicating a disabling of dynamic source updating; information within the application programming interface indicating a disabling of dynamic source updating for the audio source; and a quality determiner configured to determine a lowering of quality of an output audio signal when the audio source is processed with dynamic source updating.

Determining information indicating, for the sound source, about the propagation delay may comprise determining information indicating, for the sound source a disabling of time-varying propagation delay.

According to a third aspect there is provided an apparatus for processing at least one immersive audio signal, the at least one immersive audio signal comprising at least one audio signal associated with a sound source, at least one sound source parameter defining the sound source and at least one scene parameter for acoustically defining a scene within which the sound source is located, the apparatus comprising at least one processor and at least one memory including a computer program code, the at least one memory and the computer program code configured to, with the at least one processor, cause the apparatus at least to: obtain the at least one audio signal associated with the sound source; obtain the at least one sound source parameter defining the sound source; obtain the at least one scene parameter for acoustically defining the scene within which the sound source is located; determine information, for the sound source, about a propagation delay; and process the at least one audio signal based on the information, wherein the apparatus caused to process the at least one audio signal may be caused to: determine at least one early reverberation parameter; and render the at least one audio signal based on the at least one early reverberation parameter.

The information, for the sound source, about a propagation delay may comprise at least one of: information indicating, for the sound source, about the propagation delay; and a propagation delay value.

The apparatus may be further caused to determine a control of propagation delay processing based on the information, for the sound source, about the propagation delay.

The apparatus caused to determine the control of propagation delay processing based on the information, for the sound source, about the propagation delay may be further caused to control processing the propagation delay for the at least one audio signal based on the determined control of propagation delay processing.

The apparatus caused to render the at least one audio signal may be caused to: disable early reverberation based processing of the at least one audio signal; and enable late reverberation based processing of the at least one audio signal, wherein the late reverberation based processing of the at least one audio signal may comprise an enabled startup phase.

The apparatus caused to enable the late reverberation based processing of the at least one audio signal, comprising the enabled startup phase may be caused to: obtain a dimension of the scene based on the at least one scene parameter; determine at least one time delay for at least one reflection path based on the dimension of the scene; and generate reverberation audio signals based on the application of the at least one time delay to at least part of the at least one audio signal associated with the sound source.

The apparatus caused to render the at least one audio signal may be caused to: enable early reverberation based processing of the at least one audio signal based on the at least one early reverberation parameter using a static propagation delay value, a static sound level value and a static direction of arrival value; and enable late reverberation based processing of the at least one audio signal.

The apparatus caused to enable early reverberation based processing of the at least one audio signal based on the at least one early reverberation parameter using the static propagation delay value, the static sound level value and the static direction of arrival value may be caused to: determine a position of the sound source based on the at least one sound source parameter; obtain a dimension of the scene based on the at least one scene parameter; determine the static time delay value, the static sound level value and the static direction of arrival value for a reflection path based on the dimension of the scene and the position of the sound source; and generate early reverberation audio signals based on the application of the static time delay value, the static sound level value and the static direction of arrival value to at least part of the at least one audio signal associated with the sound source.

The apparatus caused to render the at least one audio signal may be caused to: enable early reverberation based processing of the at least one audio signal based on the at least one early reverberation parameter using a static propagation delay value, a static sound level value and a time varying direction of arrival value; and enable late reverberation based processing of the at least one audio signal.

The apparatus caused to enable early reverberation based processing of the at least one audio signal may be caused to: determine a static position of the sound source based on the at least one sound source parameter, and a time-varying position of the sound source based on the at least one sound source parameter and/or time-varying position of a listener; obtain a dimension of the scene based on the at least one scene parameter; determine the static time delay value, and the static sound level value for a reflection path based on the dimension of the scene and the static position of the sound source; determine the time-varying direction of arrival value for a reflection path based on the dimension of the scene and the time-varying position of the sound source and/or time-varying position of the listener; and generate early reverberation audio signals based on the application of the static time delay value, the static sound level value and the time-varying direction of arrival value to at least part of the at least one audio signal associated with the sound source.

The apparatus caused to render the at least one audio signal may be caused to: enable early reverberation based processing of the at least one audio signal based on the at least one early reverberation parameter using a time-varying propagation delay value, a time-varying sound level value and time-varying direction of arrival value; and enable late reverberation based processing of the at least one audio signal.

The apparatus caused to enable early reverberation based processing of the at least one audio signal may be caused to: determine a time-varying position of the sound source based on the at least one sound source parameter and or time-varying position of a listener; obtain a dimension of the scene based on the at least one scene parameter; determine the time-varying time delay value, the time-varying sound level value, and the time-varying direction of arrival value for a reflection path based on the dimension of the scene and the time-varying position of the sound source and/or time-varying position of the listener; generate early reverberation audio signals based on the application of the time-varying time delay value, the time-varying sound level value and the time-varying direction of arrival value to at least part of the at least one audio signal associated with the sound source; and further phase modify the early reverberation audio signals.

The apparatus caused to further phase modify the early reverberation audio signals may be caused to decorrelate process the early reverberation audio signals.

The apparatus caused to obtain the at least one scene parameter for acoustically defining the scene within which the sound source is located may be caused to obtain at least one of: at least one scene geometry parameter; and at least one scene acoustic material parameter.

The apparatus caused to obtain the at least one scene parameter for acoustically defining the scene within which the sound source is located may be caused to obtain the at least one scene parameter from at least one of: an encoder input format description; a content creator; an augmented reality sensing apparatus; a camera; and a light ranging and detection sensor.

The apparatus caused to determine information indicating, for the sound source, about the propagation delay may be caused to determine at least one of: information indicating, for the sound source, a disabling of dynamic source updating; a flag within the at least one immersive audio signal indicating a disabling of dynamic source updating; information within the application programming interface indicating a disabling of dynamic source updating for the audio source; and a quality determiner configured to determine a lowering of quality of an output audio signal when the audio source is processed with dynamic source updating.

The apparatus caused to determine information indicating, for the sound source, about the propagation delay may be caused to determine information indicating, for the sound source a disabling of time-varying propagation delay.

According to a fourth aspect there is provided an apparatus for processing at least one immersive audio signal, the at least one immersive audio signal comprising at least one audio signal associated with a sound source, at least one sound source parameter defining the sound source and at least one scene parameter for acoustically defining a scene within which the sound source is located, the apparatus comprising: obtaining circuitry configured to obtain the at least one audio signal associated with the sound source; obtaining circuitry configured to obtain the at least one sound source parameter defining the sound source; obtaining circuitry configured to obtain the at least one scene parameter for acoustically defining the scene within which the sound source is located; determining circuitry configured to determine information, for the sound source, about a propagation delay; and processing circuitry configured to process the at least one audio signal based on the information, wherein the processing circuitry configured to process the at least one audio signal is configured to: determine at least one early reverberation parameter; and render the at least one audio signal based on the at least one early reverberation parameter According to a fifth aspect there is provided a computer program comprising instructions [or a computer readable medium comprising program instructions] for causing an apparatus to process at least one immersive audio signal, the at least one immersive audio signal comprising at least one audio signal associated with a sound source, at least one sound source parameter defining the sound source and at least one scene parameter for acoustically defining a scene within which the sound source is located, the apparatus caused to perform at least the following: obtain the at least one audio signal associated with the sound source; obtain the at least one sound source parameter defining the sound source; obtain the at least one scene parameter for acoustically defining the scene within which the sound source is located; determine information, for the sound source, about a propagation delay; and process the at least one audio signal based on the information, wherein the means configured to process the at least one audio signal is configured to: determine at least one early reverberation parameter; and render the at least one audio signal based on the at least one early reverberation parameter.

According to a sixth aspect there is provided a non-transitory computer readable medium comprising program instructions for causing an apparatus to process at least one immersive audio signal, the at least one immersive audio signal comprising at least one audio signal associated with a sound source, at least one sound source parameter defining the sound source and at least one scene parameter for acoustically defining a scene within which the sound source is located, the apparatus caused to perform at least the following: obtain the at least one audio signal associated with the sound source; obtain the at least one sound source parameter defining the sound source; obtain the at least one scene parameter for acoustically defining the scene within which the sound source is located; determine information, for the sound source, about a propagation delay; and process the at least one audio signal based on the information, wherein the means configured to process the at least one audio signal is configured to: determine at least one early reverberation parameter; and render the at least one audio signal based on the at least one early reverberation parameter.

According to a seventh aspect there is provided an apparatus for processing at least one immersive audio signal, the at least one immersive audio signal comprising at least one audio signal associated with a sound source, at least one sound source parameter defining the sound source and at least one scene parameter for acoustically defining a scene within which the sound source is located the apparatus comprising: means for obtaining the at least one audio signal associated with the sound source; means for obtaining the at least one sound source parameter defining the sound source; means for obtaining the at least one scene parameter for acoustically defining the scene within which the sound source is located; means for determining information, for the sound source, about a propagation delay; and means for processing the at least one audio signal based on the information, wherein the means for processing the at least one audio signal comprises: means for determining at least one early reverberation parameter; and means for rendering the at least one audio signal based on the at least one early reverberation parameter According to an eighth aspect there is provided a computer readable medium comprising program instructions for causing an apparatus for processing at least one immersive audio signal, the at least one immersive audio signal comprising at least one audio signal associated with a sound source, at least one sound source parameter defining the sound source and at least one scene parameter for acoustically defining a scene within which the sound source is located the apparatus configured to perform at least the following: obtaining the at least one audio signal associated with the sound source; obtaining the at least one sound source parameter defining the sound source; obtaining the at least one scene parameter for acoustically defining the scene within which the sound source is located; determining information, for the sound source, about a propagation delay; and processing the at least one audio signal based on the information, wherein processing the at least one audio signal comprises: determining at least one early reverberation parameter; and rendering the at least one audio signal based on the at least one early reverberation parameter.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
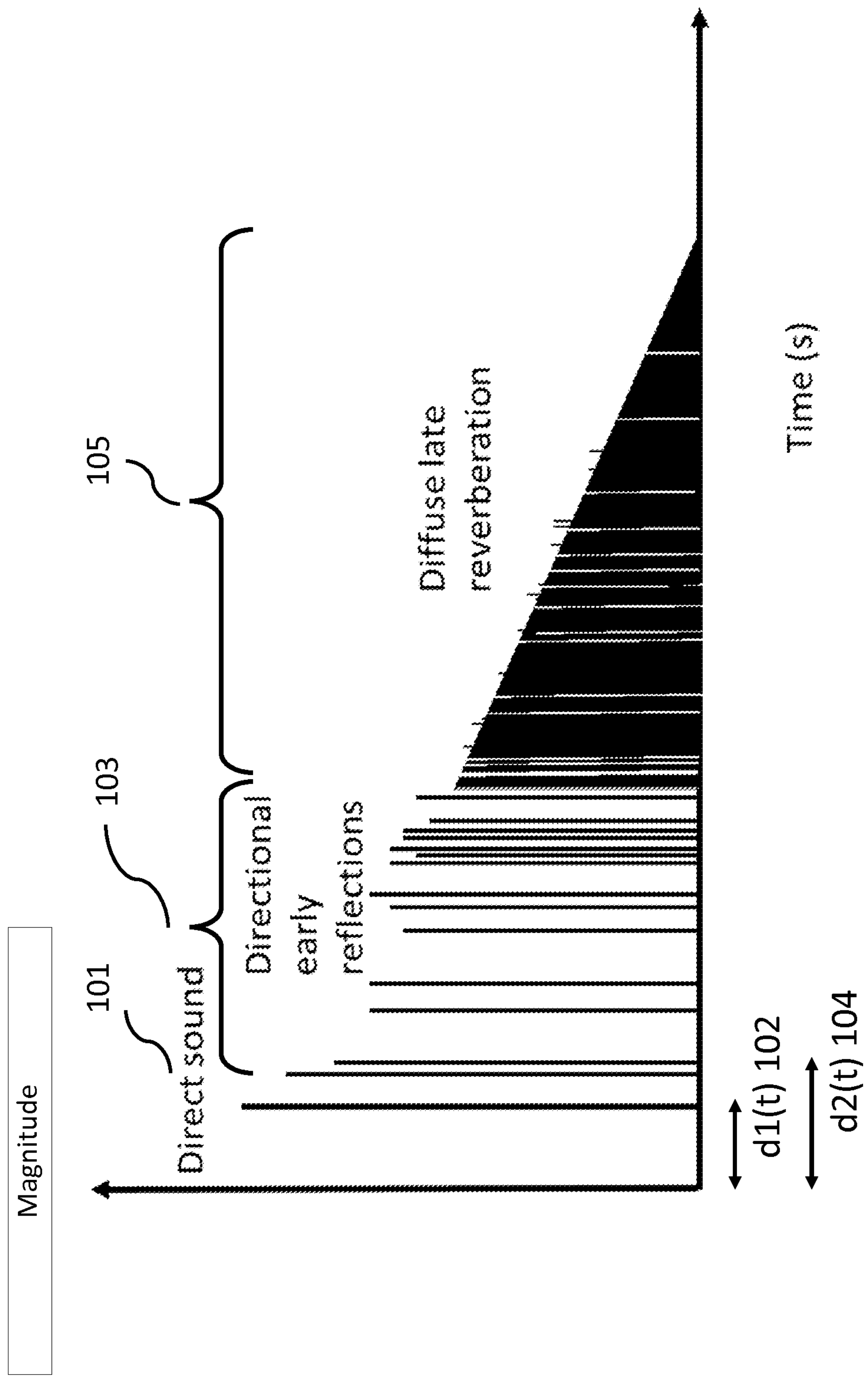
FIG. 1 shows a model of room acoustics and the room impulse response.

The following describes in further detail suitable apparatus and possible mechanisms for parameterizing and rendering audio scenes with reverberation. According to the MPEG-I encoder-input-format (EIF) specification, a content author can define a noDoppler flag for a sound source. This causes the sound source to be rendered without the time-varying propagation delay or without propagation delay for early reverberations. The embodiments as discussed herein attempt to render the early reflection portion of the sound with more accuracy than current approaches in cases where the content has an indication that the sound source is to be rendered without the time-varying propagation delay.

This is because if the early reflections of such indicated audio sources were rendered with a time-varying propagation delay, the rendering of early reflections would not be matched to the direct sound as, for example, the early reflection portion of the rendered sound would be delayed compared to the direct sound which has no delay, causing excessive differences in the relative delay between the direct sound and early reflections. Moreover, if the source or listener moves then the lengths of the reflection paths change. This would cause the delays of the early reflections to change dynamically and audible doppler effect to be heard (and not in the direct sound). This would also mean that the time of arrival of early reflections would be dynamic but the direct sound would not. If the early reflections were summed to the direct sound with variable delay, while not varying the delay of the direct sound, time-varying comb filtering artifacts would be audible.

As such the embodiments as discussed in further detail are configured to relate to rendering of immersive audio within a 6-degree-of-freedom (i.e., the listener can move within the scene and the listener position is tracked) audio scene. Additionally the embodiments as discusses herein show a method for ensuring the quality of audio rendering when a time-varying propagation delay is disabled for a sound source which is achieved by obtaining information indicating disabling of time-varying propagation delay for a sound source. Furthermore the method may comprise obtaining from the bitstream at least one sound signal corresponding to the sound source and rendering an immersive audio scene to the user, where the sound source is rendered without applying time-varying propagation delay and rendering of at least one early reflection for the sound source involves using a diffuse late reverberator without attenuating its startup phase. In some embodiments the rendering without applying time-varying propagation delay and rendering of at least one early reflection for the sound source involves using a static propagation delay and direction of arrival. Furthermore in some embodiments the rendering without applying time-varying propagation delay and rendering of at least one early reflection for the sound source involves using a static propagation delay and time-varying direction of arrival. In some embodiments the rendering without applying time-varying propagation delay and rendering of at least one early reflection for the sound source involves using time-varying propagation delay and additional phase modifying processing such as decorrelation.

The information which indicates disabling the time-varying propagation delay for a sound source can be provided by the content creator in the bitstream or it can be enabled during rendering time by calling a method on the control interface of the renderer.

In some embodiments the implementation comprises software running on an encoder device and/or a decoder/renderer device. The functionality of the system depends on whether an input audio scene is intended for virtual reality (VR) or augmented reality (AR) reproduction.

If the input audio scene is intended for VR reproduction, then the input scene for the encoder contains description of virtual scene acoustics. In this case the encoder can derive parameters for reproducing virtual acoustic effects such as reverberation and material absorption.

Figure 2:
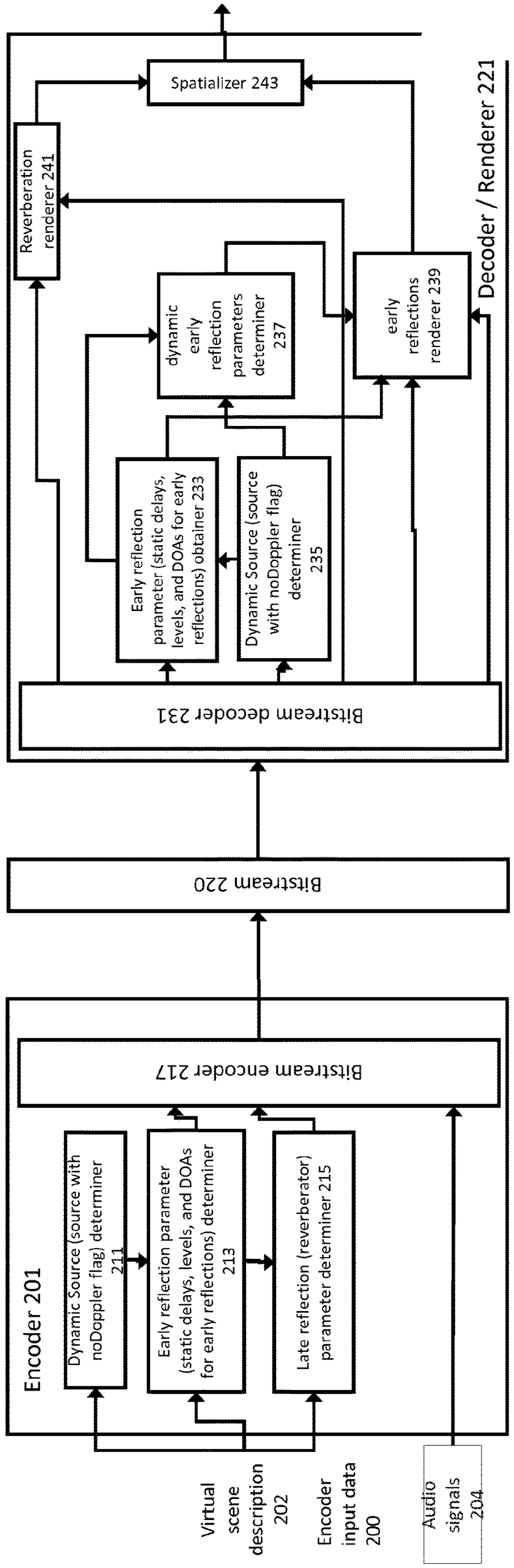
FIGS. 2 and 3 show schematically example system architecture within which some embodiments may be implemented.

With respect to FIG. 2 is shown an example system of apparatus suitable for implementing embodiments as described herein in further detail hereafter with respect to a virtual reality (VR) implementation.

For example in some embodiments the system of apparatus comprises an encoder 201. The encoder is configured to derive acoustic parameters. The encoder 201 is configured to receive or otherwise determine encoder input data 200 such as audio signals 204 and virtual scene description parameters 202.

The virtual scene description parameters 202 in some embodiments comprises a virtual scene geometry which may be defined as a triangle mesh format, the (mesh) acoustic material characteristics, the (mesh) reverberation characteristics, audio object positions (which can be defined in some embodiments as cartesian coordinates).

The method derives reverberator parameters based on the scene geometry and reverberation characteristics. If reverberation characteristics are not provided they can be obtained via acoustic simulation using the virtual scene geometry and material characteristics. Geometric or wave-based virtual acoustic simulation methods or their combination can be used. For example, wave-based virtual acoustic simulation for lower frequencies and geometric acoustic methods for higher frequencies. The method described in GB patent application GB2101657.1 can be used for deriving reverberator parameters.

The virtual scene description parameters 202 can in some embodiments be passed to a dynamic source determiner 211, an early reflection parameter determiner (such as a static delays, levels and directions of arrivals for early reflections parameters) 213, and a late reflection (reverberation) parameter determiner 215.

The encoder in some embodiments comprises a dynamic source determiner 211, the dynamic source determiner 211 is configured to receive the virtual scene description 202 and generate an indicator or information which can be passed to the early reflection parameter determiner 213. In some embodiments the determiner is configured to determine at least one source where there is an active noDoppler flag.

The MPEG-I encoder input format can indicate the following format, various parameters for an audio object source:

<ObjectSource id="objSrc: testSound" position="4.2 5.2-3.5" orientation="90.0 0.00 0.00" gainDb="−6" signal="sgnl:test" aparams="noDoppler"/>

In the above, the authoring parameters are represented with the field aparams, and it having a value "noDoppler" indicates that time varying propagation delay is not to be rendered for this sound source.

Furthermore in some embodiments the encoder 201 comprises an early reflection parameter determiner 213. The early reflection parameter determiner 213 is configured to obtain or receive the virtual scene description 202 and furthermore the information/indicator from the dynamic source determiner 211 and based on these generate suitable early reflection parameters such as such as a static delays, levels and directions of arrivals for early reflections parameters. The early reflection parameters are for VR scenes where the virtual scene geometry is known. Early reflection parameters can further comprise, for example, determining relevant reflecting planes or other geometrically meaningful surfaces for early reflection rendering. Early reflection parameter determiner 213 in some embodiments is further configured to optimize the static early reflection parameters.

These can be passed to the late reflection parameter determiner 215 and a bitstream encoder 217.

In some embodiments the encoder 201 comprises a late reflection parameter determiner 215. The late reflection parameter determiner 215 is configured to obtain or receive the virtual scene description 202 and furthermore information from early reflection parameter determiner 213 and based on these generate suitable late reflection (reverberation) parameters. The late reflection (reverberation) parameters are based on the scene geometry and reverberation characteristics. In some embodiments where reverberation characteristics (for the virtual scene geometry) are not provided they can be obtained via a suitable acoustic simulation using the virtual scene geometry and material characteristics. For example geometric and/or wave-based virtual acoustic simulation methods can be used. For example in some embodiments wave-based virtual acoustic simulation method can be implemented for lower frequencies and geometric acoustic simulation method can be implemented for higher frequencies. The method described in patent application GB 2101657.1 can be implemented for deriving reverberator parameters.

These can be passed to the bitstream encoder 217.

The encoder 201 in some embodiments comprise a bitstream encoder 217 configured to receive the early reflection parameters, the late (reverberation) reflection parameters, the dynamic source information and the audio signals and generate a suitable encoded bitstream 220. In an embodiment, the encoder 201 is configured to encode the dynamic source information, such as the noDoppler flag, into the bitstream 220. For example, the encoder can encode the value of the noDoppler flag into the value of a single binary digit for each audio element with the value 1 indicating the presence of noDoppler and the value 0 indicating that the noDoppler flag is not set. In alternative embodiments, the noDoppler flag can be a number with more values than 2. For example, in the case the dynamic source information contains three bits, then the different values of the dynamic source information can indicate different alternative processing methods that can be applied for a source. For example, the values can correspond to 0: noDoppler not set, perform normal rendering with time-varying arrival delay for direct sound & early reflections, calculate early reflections dynamically based on source & listener position, render late diffuse reverberation 1: noDoppler set, perform rendering as described in FIG. 7

Figure 8:
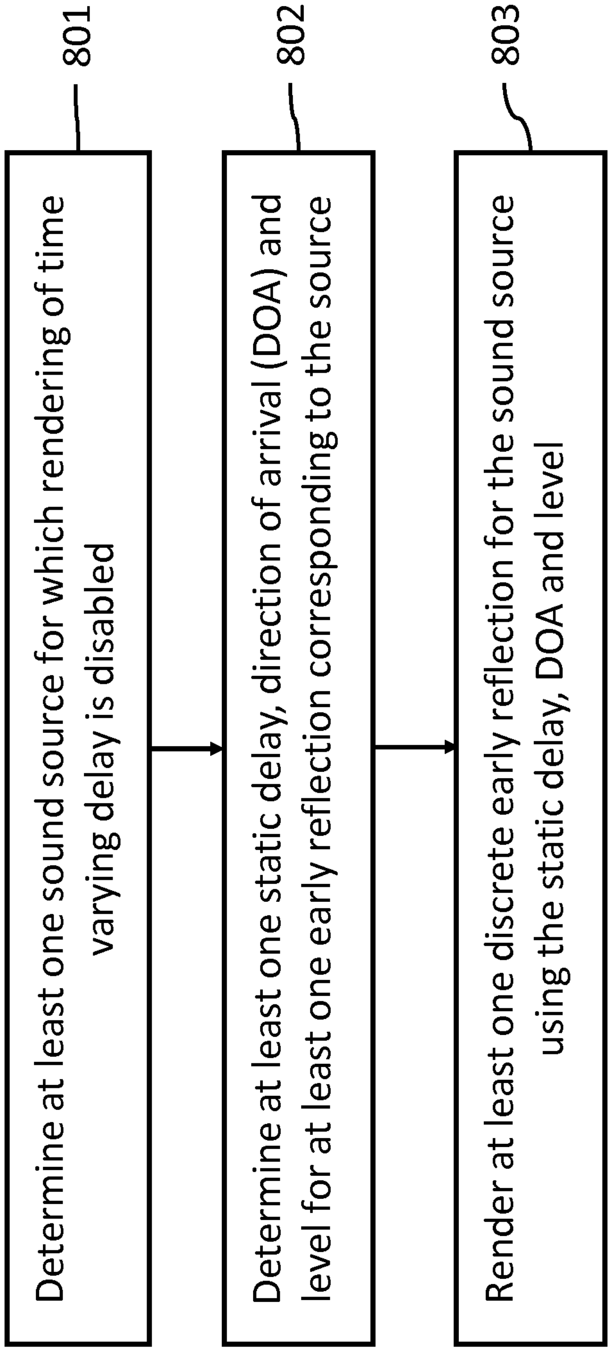

2: noDoppler set, perform rendering as described in FIG. 8

Figure 9:
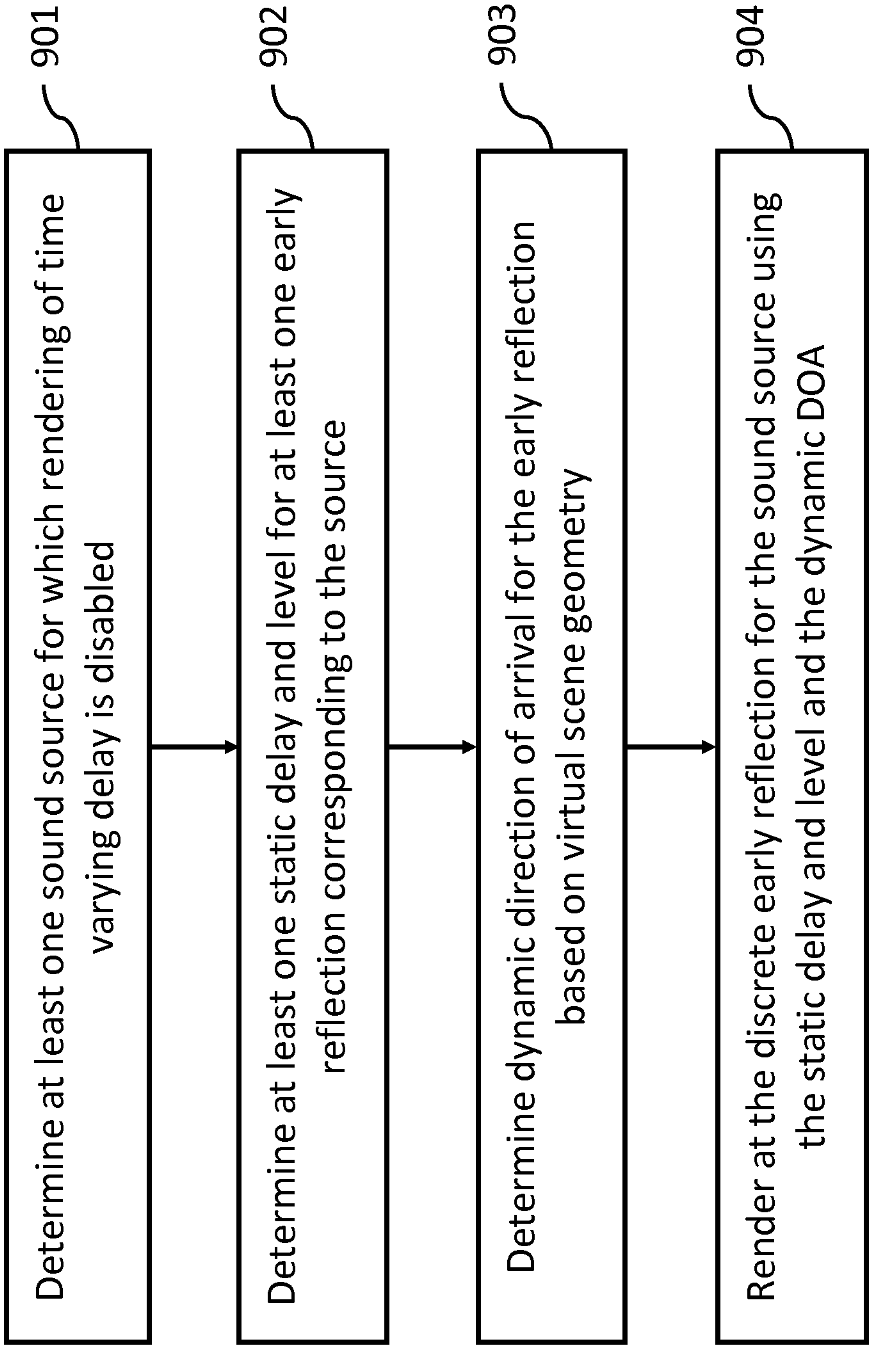

3: noDoppler set, perform rendering as described in FIG. 9

Figure 10:
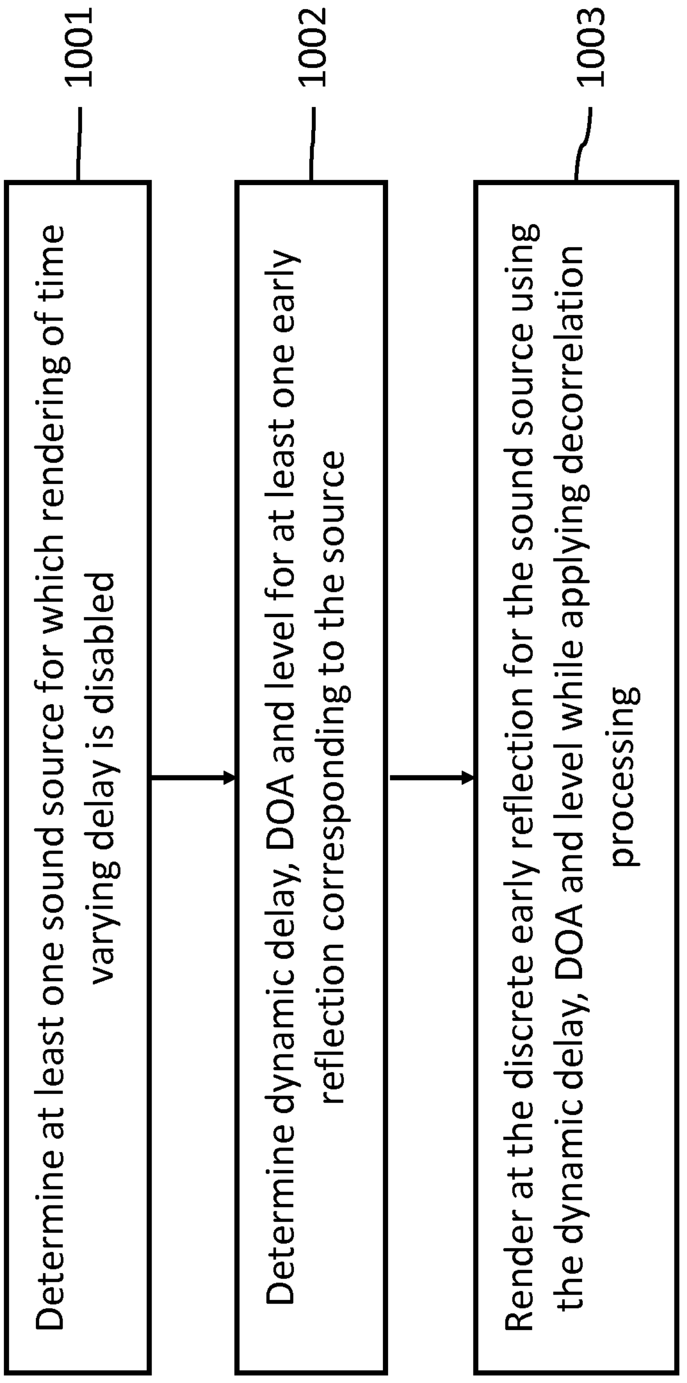

4: noDoppler set, perform rendering as described in FIG. 10

The method to be used can be indicated by the content creator manually or be determined automatically by the encoder device. Values 5 through 7 are reserved for future usage such as new methods. In alternative embodiments, the dynamic source information could be in other than numeric format such as text string.

The system of apparatus further comprises in some embodiments a decoder/renderer 221. The decoder/renderer 221 is configured to obtain the encoded acoustic parameters and audio signals and from these render a suitable spatial audio signal. The renderer is configured to perform spatial audio rendering, for example, in 6DoF where listener position is constantly updated. Listener position can be obtained from a suitable head tracking apparatus. The rendering can comprise simulating different acoustic effects such as medium attenuation (air absorption), propagation delay, material absorption for the direct sound and early reflections. Filtered audio signal frames (both from medium/material processing) and reverberation processing can then be input to a spatialization module, which uses, for example, head-related-transfer-function rendering for reproducing the signals.

In some embodiments the decoder/renderer 221 comprises a bitstream decoder 231. The bitstream decoder 231 is configured to output any dynamic source information to the dynamic source determiner 235, decoded audio signals to the early reflections renderer 239 and the reverberation renderer 241, decoded late reflection parameters to the reverberation renderer 241 and decoded early reflection parameters to the early reflection parameter obtainer 233.

The decoder/renderer 221 in some embodiments comprises a dynamic source (a source with noDoppler flag) determiner 235, the dynamic source determiner 235 is configured to receive information from the bitstream decoder 231 and generate an indicator or information which can be passed to the early reflection parameter obtainer 233 and the dynamic early reflection parameter determiner 237.

Furthermore in some embodiments the decoder/renderer 221 comprises an early reflection parameter obtainer 233. The early reflection parameter obtainer 233 is configured to obtain the decoded early reflection parameters and the information/indicator from the dynamic source determiner 235 and based on these generate suitable early reflection parameters such as such as a static delays, levels and directions of arrivals for early reflections parameters. The early reflection parameters can be passed to the early reflections renderer 239.

In some embodiments the decoder/renderer 221 comprises a dynamic early reflection parameter determiner 237 is configured to receive an input from the dynamic source (a source with noDoppler flag) determiner 235 and early reflection parameter obtainer 233 and based on these generate suitable dynamic early reflection parameters which can be passed to the early reflections renderer 239.

The decoder/renderer 221 in some embodiments further comprises an early reflections renderer 239. The early reflections renderer 239 is configured to receive the dynamic early reflection parameters from the dynamic early reflection parameters determiner 237, the early reflection parameters from the early reflection parameter obtainer 233 and the decoder audio signals and based on these generate suitable direct and early reflection components of the spatial audio signals. These direct and early reflection components can then be passed to the spatializer 243.

In some embodiments the decoder/renderer 221 comprises a reverberation renderer 241. The reverberation renderer 241 is configured to obtain the decoded audio signals and the decoded late reflection (reverberation) parameters and generate the reverberation components of the spatial audio signal which is passed to the spatializer 243. The reverberator renderer outputs can be rendered as point sources around the listener at fixed distance, such as one meter. In an embodiment the spatial positions (azimuth, elevation) for reverberator output rendering are signalled in the bitstream.

The decoder/renderer 221 furthermore in some embodiments comprises a spatializer 243 configured to obtain the direct and early reflection components and the late reflection components and combine these to generate a suitable spatial audio signal.

Figure 3:
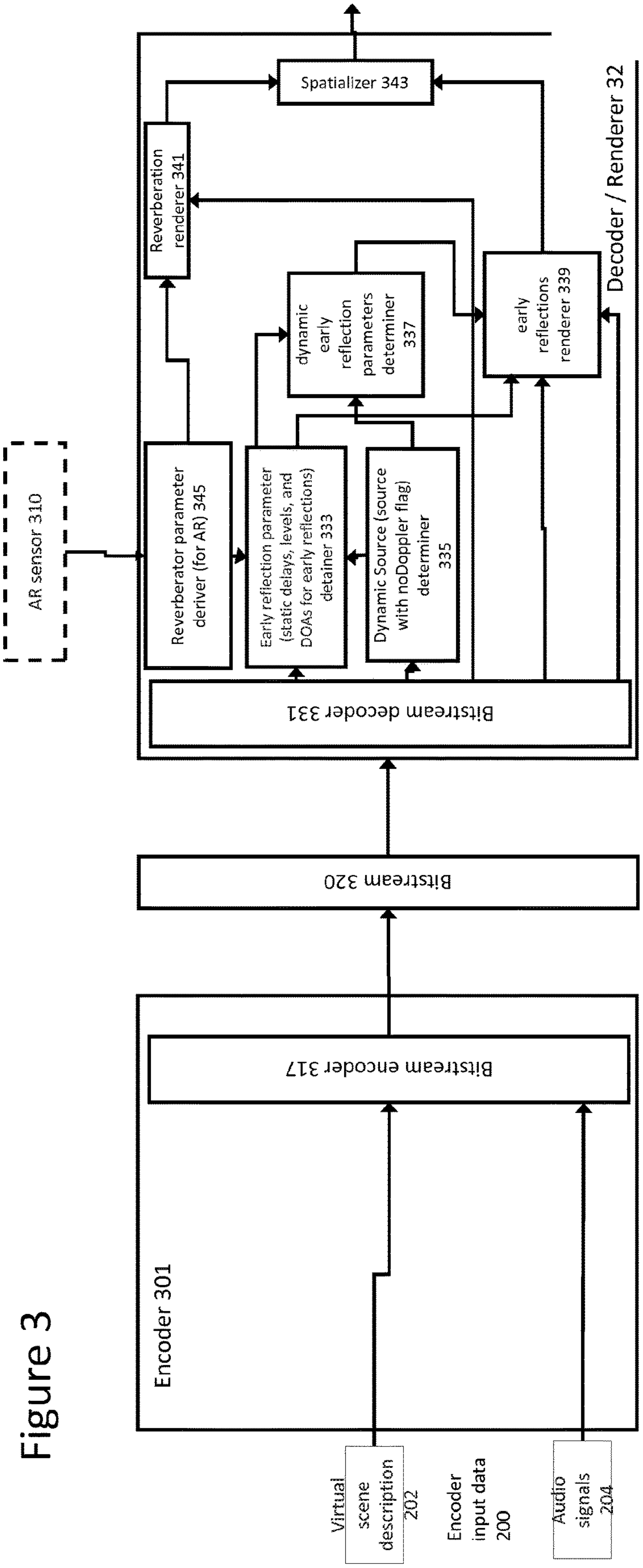

With respect to FIG. 3 is shown an example system of apparatus suitable for implementing embodiments as described herein in further detail hereafter with respect to an augmented reality (AR) implementation. In such apparatus then virtual scene acoustics is not available but the renderer receives a description of the physical scene acoustics. The physical scene in embodiments is the listening room of the user or other space where the user consumes the audio content. Obtaining information of the physical scene acoustics helps the renderer to adjust the audio rendering to the acoustic characteristics of the physical listening environment. In this case the encoder cannot derive parameters for reproducing virtual acoustics but is implemented in the renderer.

In other words the methods implemented can be the same in both cases with the difference that some operations are performed in different devices. In the case of VR, more operations are performed on the encoder and information is included into a bitstream which is read on the renderer. In the case of AR the operations are performed in the renderer.

For example in some embodiments the system of apparatus comprises an encoder 301. The encoder is configured to derive acoustic parameters. The encoder 301 is configured to receive or otherwise determine encoder input data 200 such as audio signals 204 and virtual scene description parameters 202. The virtual scene description parameters 202 in some embodiments comprises a virtual scene geometry which may be defined by audio object positions (which can be defined in some embodiments as cartesian coordinates). As indicated above the room or scene parameters in AR are generally determined at the renderer. In some embodiments where there is a mixed AR/VR scene then a combination of virtual scene and physical scene parameters can be determined, where the virtual scene parameters defined at the encoder, the physical scene parameters defined at the decoder/renderer and then combined in a suitable form also within the decoder/renderer.

The virtual scene description parameters 202 and audio signals 204 can in some embodiments be passed to a bitstream encoder 317.

The encoder 301 in some embodiments comprise a bitstream encoder 317 configured to receive the virtual scene description and the audio signals and generate a suitable encoded bitstream 320.

The system of apparatus further comprises in some embodiments an augmented reality (AR) sensor 310. The AR sensor 310 is configured to generate information identifying the physical scene (the augmented reality environment) surrounding the user/listener and pass this to the decoder/renderer 321. Thus the decoder/renderer obtains physical room information from the AR sensor and can be configured to update reflection and reverberation parameters based on it.

The AR sensor can be any suitable sensor for example a lidar system for mapping the environment within which the user is in.

The system of apparatus further comprises in some embodiments a decoder/renderer 321. The decoder/renderer 321 is configured to obtain the encoded virtual scene parameters and audio signals and from these render a suitable spatial audio signal. The renderer is thus configured to perform spatial audio rendering, for example, in 6DoF where listener position is constantly updated. Listener position can be obtained from a suitable head tracking apparatus. The rendering can comprise simulating different acoustic effects such as medium attenuation (air absorption), propagation delay, material absorption for the direct sound and early reflections. Filtered audio signal frames (both from medium/material processing) and reverberation processing can then be input to a spatialization module, which uses, for example, head-related-transfer-function rendering for reproducing the signals.

In some embodiments the decoder/renderer 321 comprises a bitstream decoder 331. The bitstream decoder 331 is configured to output any dynamic source information to the dynamic source determiner 335, decoded audio signals to the early reflections renderer 339 and the reverberation renderer 341, and decoded virtual scene description parameters to the reverberation renderer 341 and early reflection parameter determiner 333.

In some embodiments the decoder/renderer 321 comprises a reverberation parameter deriver (for AR) 345. The reverberation parameter deriver is configured to obtain the information from the AR sensor 310 and generate suitable reverberation parameters based on the AR information which can be passed to the reverberation renderer 341 and also to the early reflection parameter determiner 333. The late reflection (reverberation) parameters are based on the physical scene geometry and reverberation characteristics. In some embodiments the reverberation characteristics (for the physical scene geometry) are obtained via a suitable acoustic simulation using the physical scene geometry and material characteristics. For example geometric and/or wave-based virtual acoustic simulation methods can be used. Thus in some embodiments wave-based physical scene acoustic simulation method can be implemented for lower frequencies and geometric acoustic simulation method can be implemented for higher frequencies. The method described in patent application GB 2101657.1 can be implemented for deriving reverberator parameters.

The decoder/renderer 321 in some embodiments comprises a dynamic source determiner 335, the dynamic source determiner 335 is configured to receive information from the bitstream decoder 331 and generate an indicator or information which can be passed to the early reflection parameter determiner 333.

Furthermore in some embodiments the decoder/renderer 321 comprises an early reflection parameter determiner 333. The early reflection parameter determiner 333 is configured to obtain the decoded virtual scene description parameters and the information/indicator from the dynamic source determiner 335 and suitable reverberation parameters based on the AR information from the reverberation parameter deriver 345 and based on these generate suitable early reflection parameters such as such as a static delays, levels and directions of arrivals for early reflections parameters. The early reflection parameters can be passed to the early reflections renderer 339.

In some embodiments the decoder/renderer 321 comprises a dynamic early reflection parameter determiner 337 is configured to receive an input from the dynamic source determiner 335 and early reflection parameter obtainer 333 and based on this generate suitable dynamic early reflection parameters which can be passed to the early reflections renderer 339. In some embodiments the determiner is configured to determine at least one source which is not to be dynamically updated. This for example may be implemented by the determiner being configured to determine a source where there is an active noDoppler flag.

The decoder/renderer 321 in some embodiments further comprises an early reflections renderer 339. The early reflections renderer 339 is configured to receive the dynamic early reflection parameters from the dynamic early reflection parameters determiner 337, the early reflection parameters from the early reflection parameter determiner 333 and the decoder audio signals and based on these generate suitable direct and early reflection components of the spatial audio signals. These direct and early reflection components can then be passed to the spatializer 343.

In some embodiments the decoder/renderer 321 comprises a reverberation renderer 341. The reverberation renderer 341 is configured to obtain the decoded audio signals and the reverberation parameters based on the AR information from the reverberation parameter deriver 345 and generate the reverberation components of the spatial audio signal which is passed to the spatializer 343. The reverberator renderer outputs can be rendered as point sources around the listener at fixed distance, such as one meter. In an embodiment the spatial positions (azimuth, elevation) for reverberator output rendering are signalled in the bitstream.

The decoder/renderer 321 furthermore in some embodiments comprises a spatializer 343 configured to obtain the direct and early reflection components and the late reflection components and combine these to generate a suitable spatial audio signal.

In such a manner the reflection signals can be rendered in suitable spatial positions around the listener depending on the simulated sound arrival path.

Figure 4:
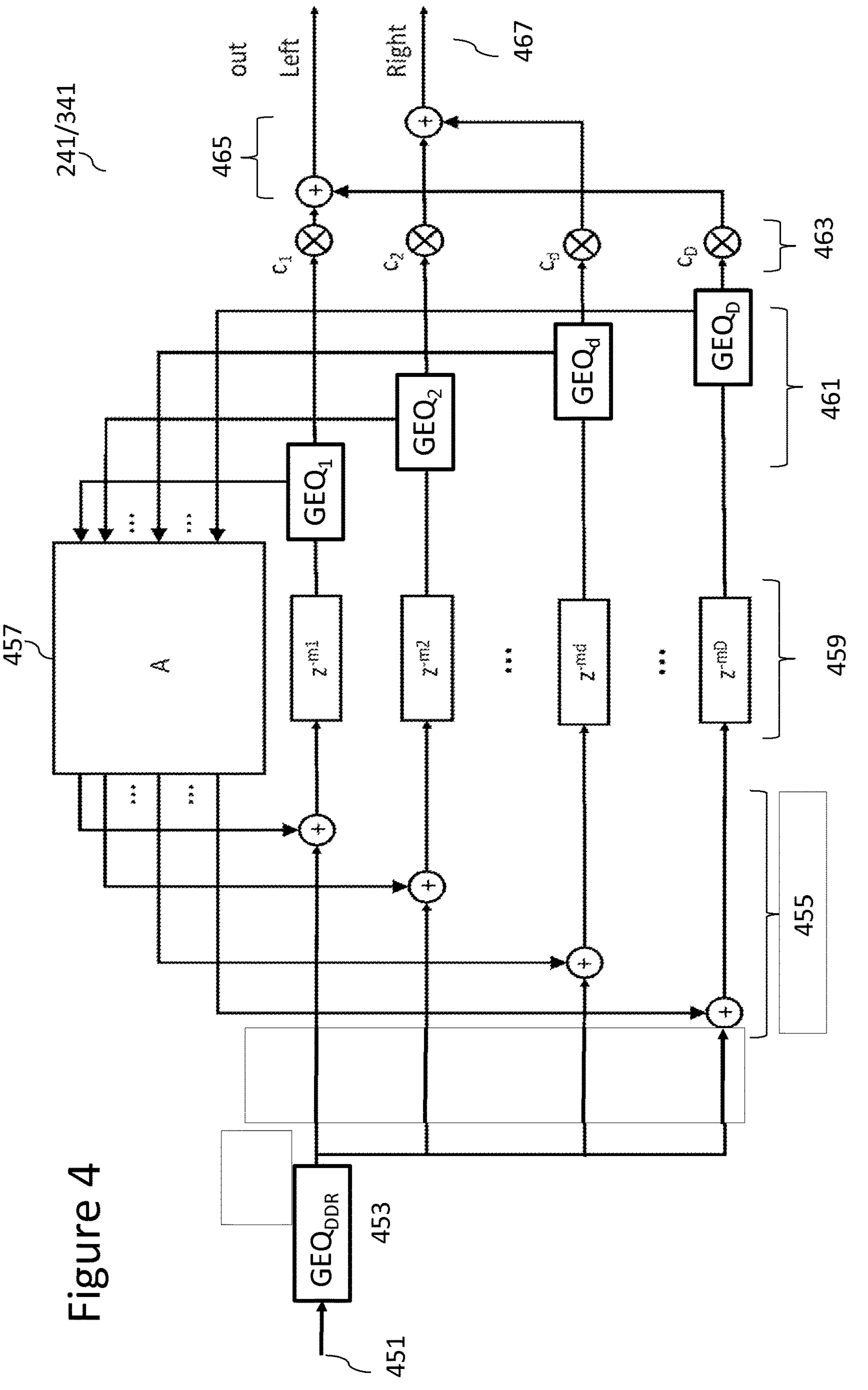
FIGS. 4 and 5 show schematically example rendering apparatus as shown in FIGS. 2 and 3 within which some embodiments may be implemented.

With respect to FIG. 4 is shown an example reverberation renderer 241/341 which is shown as being implemented as a Feedback Delay Network (FDN)-reverberator.

The example FDN-reverberator implementation is configured such that the reverberation parameters are processed to generate coefficients $GEQ_d$ ($GEQ_1$, $GEQ_2$, . . . $GEQ_D$) of each attenuation filter 461, feedback matrix 457 coefficients A, lengths $m_d$ ($m_1$, $m_2$, . . . $m_D$) for D delay lines 459 and direct-to-reverberant ratio filter 453 coefficients $GEQ_{DDR}$.

In some embodiments each attenuation filter $GEQ_d$ is implemented as a graphic EQ filter using M biquad IIR band filters. With octave bands M=10, thus, the parameters of each graphic EQ comprise the feedforward and feedback coefficients for 10 biquad IIR filters, the gains for biquad band filters, and the overall gain. In some embodiments any suitable manner may be implemented to determine the FDN reverberator parameters, for example the method described in patent application GB 2101657.1 can be implemented for deriving FDN reverberator parameters such that the desired RT60 time for the virtual/physical scene can be reproduced.

The reverberator uses a network of delays 459, feedback elements (shown as gains 461, 457 combiners 455 and output combiners 465) to generate a very dense impulse response for the late part. Input samples 451 are input to the reverberator to produce the late reverberation audio signal component which can then be output.

The FDN reverberator comprises multiple recirculating delay lines. The unitary matrix A 457 is used to control the recirculation in the network. Attenuation filters 461 which may be implemented in some embodiments as graphic EQ filters implemented as cascades of second-order-section IIR filters can facilitate controlling the energy decay rate at different frequencies. The filters 461 are designed such that they attenuate the desired amount in decibels at each pulse pass through the delay line and such that the desired RT60 time is obtained.

The example FDN reverberator shows a two-channel output but may be expanded to apply to more complex outputs (there could be more outputs from the FDN). More outputs can be obtained, for example, by providing the output from each FDN delay line as a separate output.

Figure 5:
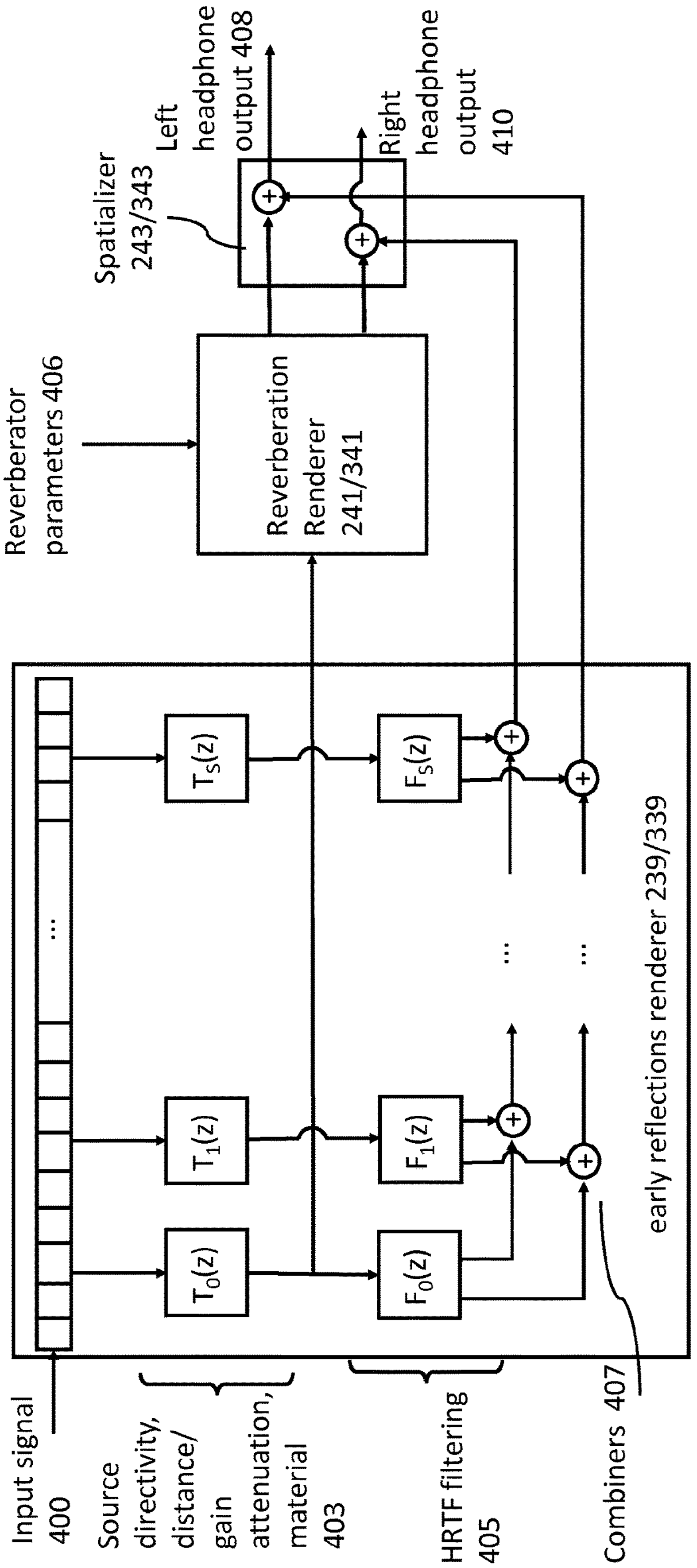

With respect to FIG. 5 furthermore is shown an example early reflections renderer 239/339 according to some embodiments. In this example the input (decoded) audio signal 400 is passed to a delay line 401. The delay line 401 implements delaying of direct sound and early reflections. From the delay lines are configured a number of taps (S+1) which can be passed to a series of filters. These filters can be divided into a first set of filters T 403 (with parameters $T_0(z)$, $T_1(z)$, . . . , $T_s(z)$) which are configured to provide source directivity and/or distance/gain attenuation, and material filtering and a second set of filters F 405 (with parameters $F_0(z)$, $F_1(z)$, . . . , $F_s(z)$) which are configured to provide head related transfer function (HRTF) filtering. The output from the HRTF filters can then be output to a series of combiners 407 which generate the output direct and early reflection components of the audio signal. Thus for example as shown in FIG. 5 there is generated a left and right channel direct and early reflection components of the audio signal which can be passed to the spatializer 243/343.

Additionally FIG. 5 shows the reverberation renderer 241/341 which receives an audio input and the reverberation parameters 406 and generates the reverberation components of the audio signal. The spatializer 243/343 is also shown combining the left and right channel components from the reverberation renderer 241/341 and the early reflections renderer 239/339 and combines them to generate the left headphone output 408 and right headphone output 410.

The determination/obtaining of early reflection parameters such as implemented within the early reflection parameter (static delays, levels, and DOAs for early reflections) determiner 213 and dynamic early reflection parameters determiner 237 are furthermore described in further detail hereafter. The early reflection parameter derivation can in some embodiments be implemented according to the methods presented in U.S. patent application Ser. No. 17/202,863, where a set of relevant reflecting planes are determined. The parameters can thus be determined based on the geometry of a virtual or physical scene. The parameters can be derived using lookup tables for AR rendering scenarios. This makes it computationally easier to render early reflections for complex scene geometries since not all acoustic surfaces need to be considered in the rendering but the rendering can be based on tracing reflections using the determined relevant reflecting planes.

The reflecting planes for early reflection rendering in some embodiment are obtained from the bitstream. To synthesize an early reflection, the sound propagation from sound source is traced via the reflecting planes to the listener. The propagation path length defines the delay which needs to be applied in a delay line to the signal and also the amount of attenuation. The direction where the reflected sound arrives from to the listener along the propagation path determines the direction of arrival to be applied to the rendered reflection.

Figure 6:
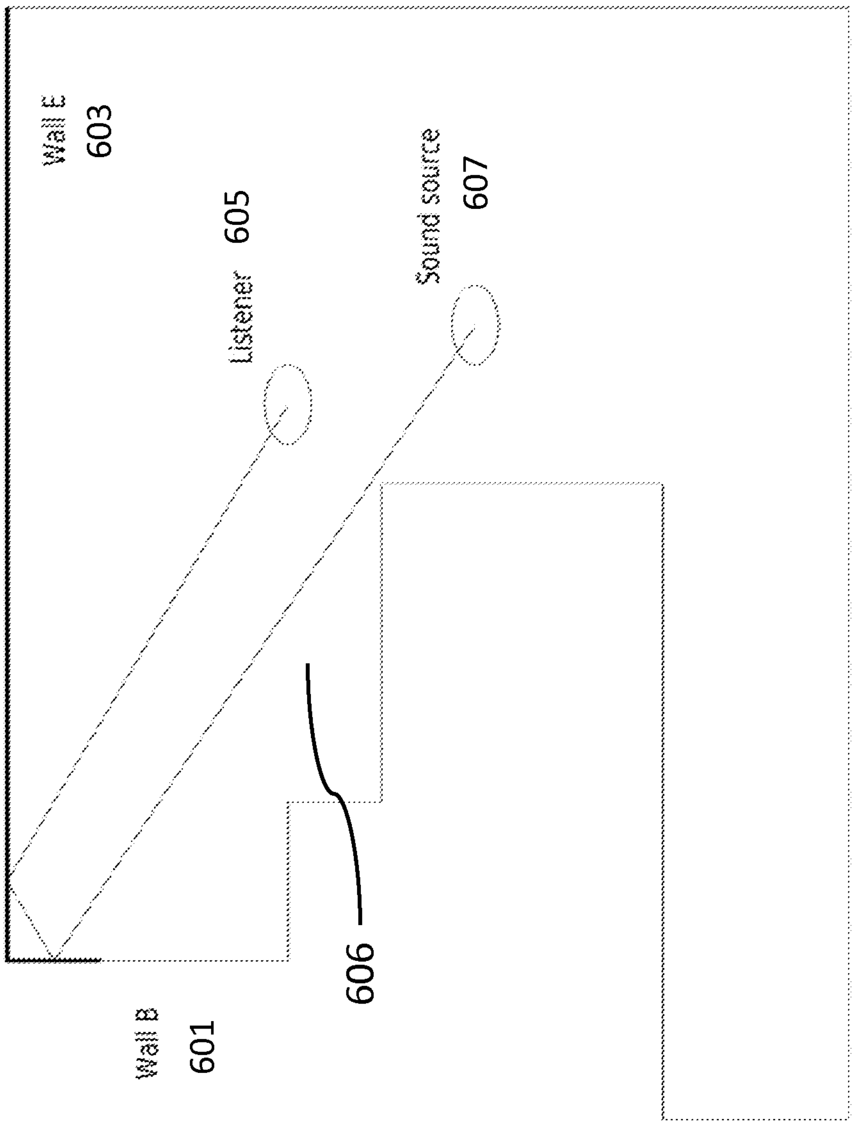
FIG. 6 shows an example scenario within which examples with early and late reflections may occur for assisting in the understanding of the embodiments.

In the example as shown in FIG. 6 a second order reflection is shown from the sound source 607 and traced 606 to the listener 605 using Walls B 601 and E 603 that have previously been determined to be reflective surfaces.

In some embodiments the arrival delays, directions, and levels of early reflections can be calculated with the help of image sources mirrored against reflecting elements in the virtual scene geometry. One or more early reflection paths can be traced from the source to the listener, via one or more reflecting elements. The delay of an early reflection can be determined based on the distance travelled by a sound reflection. The level of an early reflection can be determined by applying the air absorption and material absorption along the travel path of a reflection. The DOA of an early reflection can be determined as the direction of arrival of the reflection sound ray to the listening position.

In such a manner an early reflection can be synthesized as a delayed and filtered version of the direct sound. The delay is adjusted according to the time-varying propagation delay which is obtained based on tracing the path from the sound source to the listener via one or more reflecting materials. Filtering is applied to simulate the air absorption and material attenuation which occurs on the path.

In some embodiments, on determining a source where rendering of time-varying propagation delay is disabled, the dynamic source (source with noDoppler flag) determiner 211/235/335 is configured to control the early reflection parameter (static delays, levels, and DOAs for early reflections) determiner 213 or the dynamic early reflection parameters determiner 237 such that no delay is applied. The early reflection delays can in such embodiments be obtained dynamically based on current source and listener position or static values can be implemented.

In some embodiments, where the time-varying propagation delay is disabled for an audio source then, for this source, early reflection processing is disabled and diffuse late reverberation is used only for rendering the reverberation effects.

Figure 7:
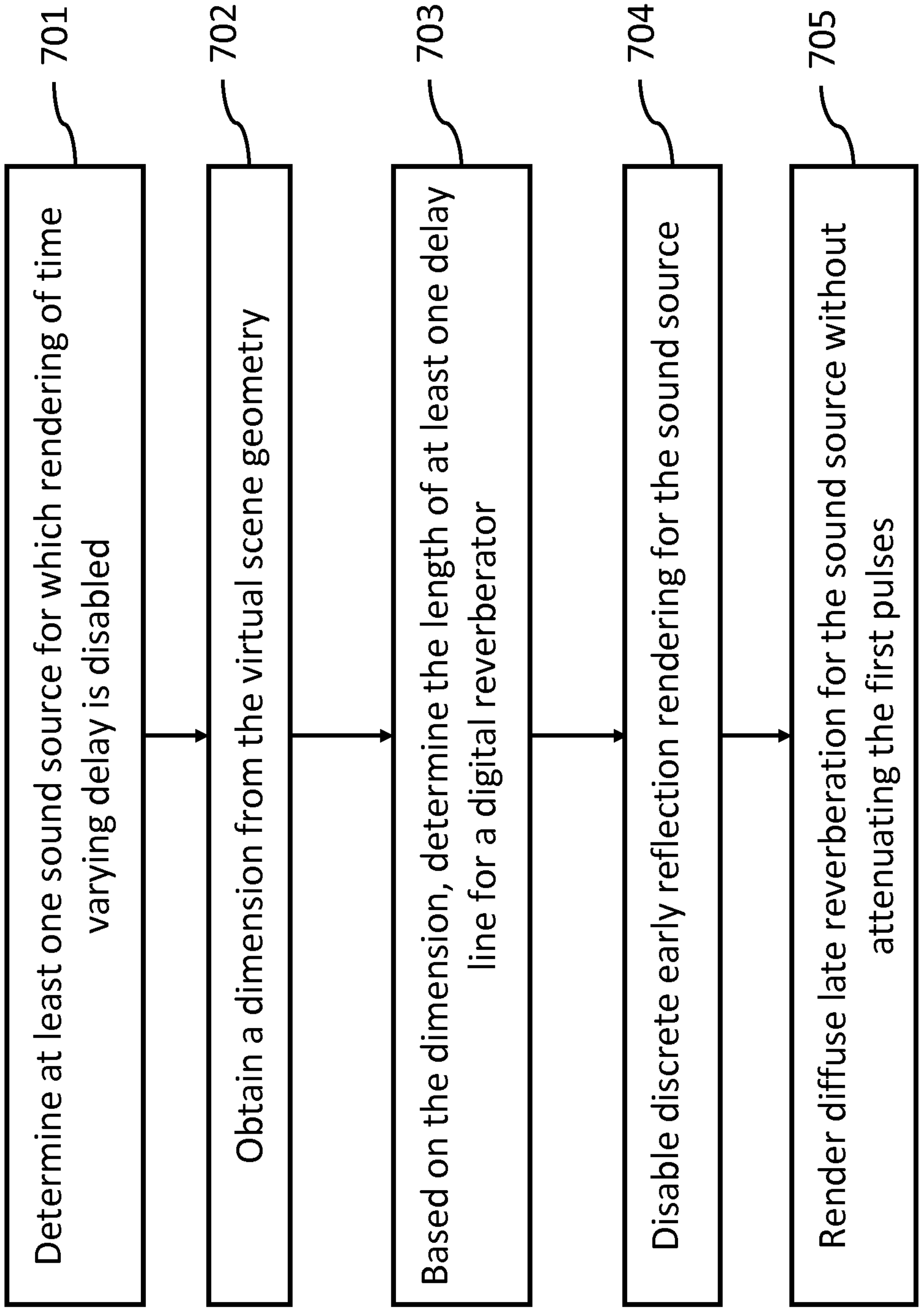
FIGS. 7 to 10 show flow diagrams of the operation of the example reverberation system as shown in FIGS. 2 to 5 according to some embodiments.

With respect to FIG. 7 is shown an example implementation method embodiment. The delay line lengths of the reverberator furthermore are then adjusted according to room dimensions, and in such a manner implements a coarse approximation of early reflections.

Thus in these embodiments there is determined at least one sound source for which time-varying propagation delay rendering is disabled as shown in FIG. 7 by step 701.

Then the dimensions of the virtual/physical scene geometry are then determined as shown in FIG. 7 by step 702.

The dimensions of the virtual/physical scene geometry can then be used to adjust the lengths of the delay lines of the FDN reverberator (the reverberation renderer 241/341) as shown in FIG. 4 as shown in the method shown in FIG. 7 by step 703.

Additionally in some embodiments the early reflection rendering for the sound source is disabled (in other words for this audio source there is no early reflection rendering) as shown in FIG. 7 by step 704. This can in some embodiments be obtained by not inputting the sound source signal to the early reflection renderer. In some embodiments, when the encoder makes the determination to not enable the rendering of early reflections for a sound source, a Boolean indicator can be included into the bitstream to indicate a disabling of early reflection rendering for the sound source. The decoder may then receive this indicator and based on the indicator control the early reflections renderer 339 to not process this audio source.

Furthermore the diffuse late reverberation for the sound source can be rendered. This for example may be implemented by inputting the sound source signal to the FDN reverberator (the reverberation renderer 241/341) as shown in FIG. 7 by step 705. In these embodiments no special attenuation is applied (other than the attenuation filters $GEQ_d$) to the FDN reverberator in order not to attenuate the first pulses which come out from the delay lines, which in this embodiment implements a simple approximation of early reflections. In some embodiments where the first pulses happen earlier than they would from the FDN then in some embodiments the delays are configured to be shorter than would otherwise be configured for the FDN reverberator for that room geometry using, for example, the method described in GB 2101657.1.

With respect to FIG. 8, there is shown a flow diagram depicting another implementation according to some embodiments. In this embodiment static propagation delays, static DOAs and static levels for early reflections are used for rendering the early portion for a sound source for which the rendering of time varying propagation delay is disabled. The static delays, DOAs, and levels can correspond to a certain listener and sound source position, such as the middle of the (physical or virtual) room or a designated listener starting position. For a moving sound, the certain position may be the start position or the average position of the (pre-known) path of the sound source. Alternatively a designated source position may be provided in the bitstream.

In such embodiments there is determined at least one sound source for which time-varying propagation delay rendering is disabled as shown in FIG. 8 by step 801.

Then the static parameters for early reflection rendering are determined as shown in FIG. 8 by step 802. This can be implemented either in the encoder or renderer. Furthermore this can be performed by placing a virtual listener in the middle of the virtual space (or into a designated starting position for the virtual space. Such a starting position can be determined, for example, by the content creator of that virtual space). The implementation can then place or obtain the sound source position. The source-to-listener distance can then be obtained. Additionally, the early reflection distances, DOAs and levels for that position can then be obtained by tracing a certain number of sound rays from the sound source to the listener utilizing image sources calculated based on the scene geometry. Then relative early reflection distances can be obtained by subtracting the source-to-listener distance from the early reflection distances. The relative early reflection distances can then be converted to relative early reflection delays. These static parameters (the relative early reflection delays along with DOAs and levels) can then be output and made available for rendering.

The early reflections are rendered based on the (static) relative early reflection delay, the DOAs and levels as shown in FIG. 8 by step 803. The rendering of early reflections is performed such that the delay, level, and DOA of early reflections is not adjusted according to source and listener position as in normal 6DoF rendering scenario, but they are kept constant. In other words this can be considered as a fixed early-reflection rendering.

In some embodiments in addition to delays, levels, and DOAs, the method can involve storing the material filters or material indices for the early reflections, and applying material attenuation to the early reflections. In this case a benefit of implementing such embodiments as compared to earlier implementation embodiments are that real material filters for rendering the early portion of the sound can be used. Thus a more realistic approximation of early reflections can be implemented at the cost of a slightly more complexity and requiring determining static early reflection parameters.

In some embodiments the DOA of early reflections may be varied according to source and listener position while keeping the levels and delays fixed. The method uses static propagation delays and levels and time varying DOA for early reflections, where the DOA adapts to listener position and is similar to the method as shown in FIG. 8 but where DOA for early reflections is calculated dynamically based on listener and source position in the scene.

With respect to FIG. 9, there is therefore shown a flow diagram depicting a further implementation according to some embodiments.

In such embodiments there is determined at least one sound source for which time-varying propagation delay rendering is disabled as shown in FIG. 9 by step 901.

Then the static parameters for early reflection rendering are determined as shown in FIG. 9 by step 902. This can be implemented either in the encoder or renderer. The source-to-listener static early reflection delays, and levels (for that position) can be determined in a similar manner to that described above.

Furthermore dynamic direction of arrival for the early reflection based on virtual scene geometry can be determined as shown in FIG. 9 by step 903.

The early reflections can then be rendered based on the static relative early reflection delay and levels and the dynamic direction of arrival values as shown in FIG. 9 by step 904. In other words in these embodiments the rendering of early reflections is performed such that the delay and level of early reflections are not adjusted according to source and listener position unlike a normal 6DoF rendering scenario, but the direction is adjusted according to the source and listener position as in a normal 6DoF rendering scenario.

In some embodiments dynamic early reflection rendering is implemented but compared to a typical 6DoF rendering situation additional decorrelation processing is applied for early reflection rendering so that comb filtering effects caused by coherent sound summation at different delays are minimized.

In some embodiments this can be implemented by decorrelation, for example, by randomizing the phase of a signal while minimizing the spectral coloration. In some embodiments velvet noise sequences can be employed for computationally efficient decorrelation whereas in some other embodiments any suitable decorrelation method can be implemented.

Thus as shown in FIG. 10 is shown a flow diagram depicting a further implementation including the additional decorrelation processing according to some embodiments.

In such embodiments there is determined at least one sound source for which time-varying propagation delay rendering is disabled as shown in FIG. 10 by step 1001.

Then early reflection rendering parameters are obtained based on the scene geometry and tracing at least one reflection from a sound source to the listener using the scene geometry and image sources as shown in FIG. 10 by step 1002.

Having determined the dynamic parameters then the early reflection rendering is implemented with additional decorrelating processing applied to the early reflection signals before they are summed to the direct signal as shown in FIG. 10 by step 1003. Decorrelating processing can be applied by running the signal through a decorrelator filter.

In some embodiments as an optional operation the delays to be used for rendering early reflections can be adjusted in an encoder device such that any comb filtering effect caused by mixing early reflections to the direct sound is minimized. This can be implemented in some embodiments by analyzing the spectral content of the mixed sound at different delays and selecting a delay which minimizes the amount of comb filtering (or makes it as inaudible as possible). The analysis of spectral content can in some embodiments be performed by calculating the spectrum of the unprocessed source signal, calculating the spectrum of the signal where the signal is summed to itself with a candidate delay value, and measuring spectral distortion. This analysis can in some embodiments be repeated for a number of candidate delay values, and the delay value corresponding to the smallest spectral distortion can be selected. In embodiments, psychoacoustic masking or other perceptual weighting can be utilized in assessing the significance caused by different delays and the corresponding spectral distortions to the perceived sound. As an example, the spectral distortion can be calculated on psychoacoustically motivated frequency resolutions such as Bark bands. Masking thresholds can in embodiments be also taken into account in the analysis.

In some embodiments a fade-in control can be applied for the FDN reverberator or reverberation renderer so that the early pulses originating from the delay network are attenuated. Such a control method can be based on double decays or on modal beating. In embodiments where there is no early reflection rendering (where the reverberation renderer approximates the early reflection components) the fade-in control is not applied or adjusted so that the first pulses originating from the FDN reverberator are not attenuated (since the reverberator produces coarse approximation of early reflections and would produce significantly attenuated early reflections).

In some embodiments when the encoder determines that for a certain sound source the early reflection rendering is not implemented then an indicator/information/signal can control the renderer to disable any FDN dampening for a sound source. For example a flag FDNFadeIn=False can be passed from the encoder to the decoder/renderer. In these embodiments, there can be two FDN reverberators, one for sound sources with dampening and another for sound sources without dampening.

Figure 11:
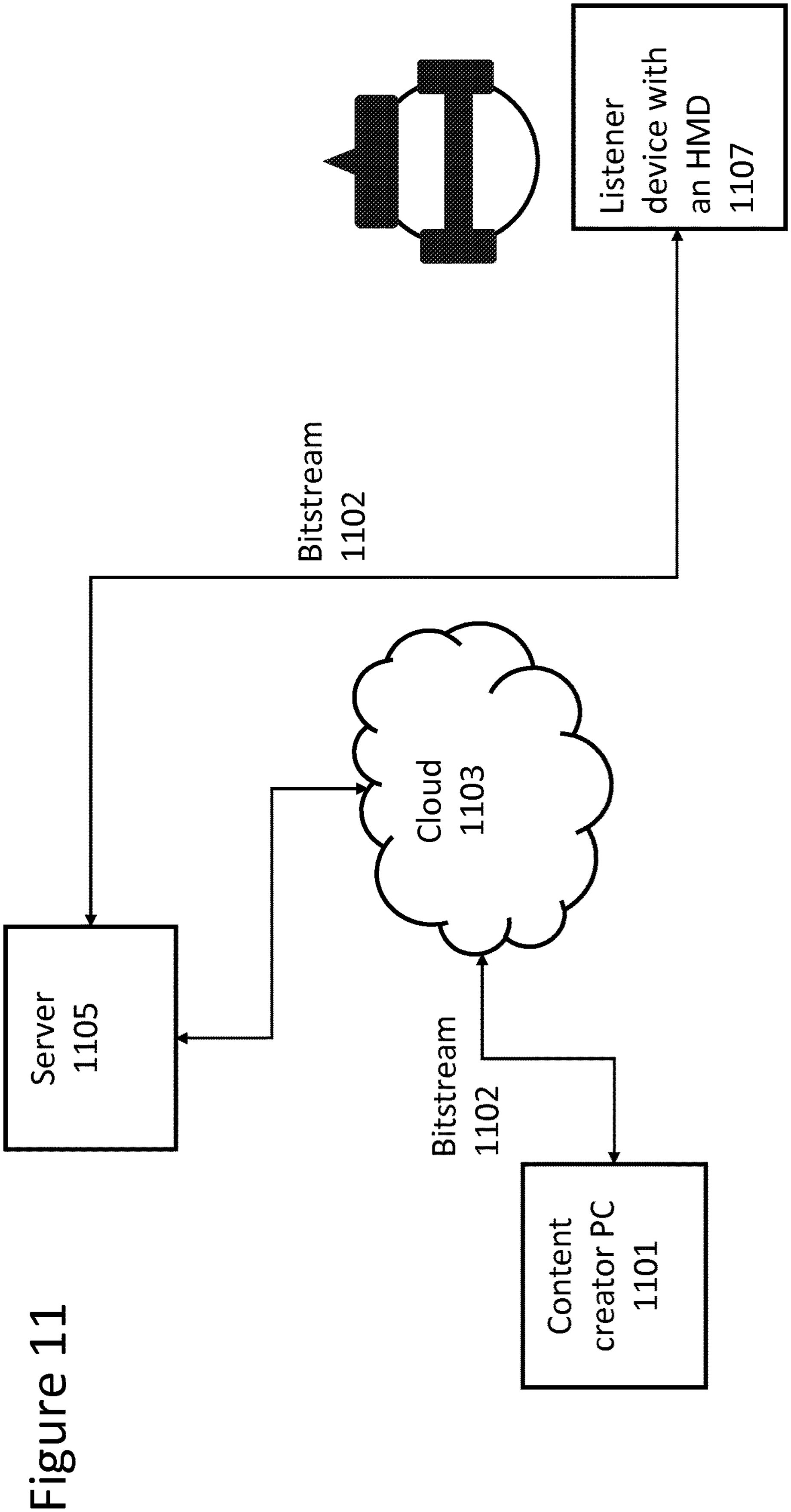
FIG. 11 shows an implementation of the system according to some embodiments.

With respect to FIG. 11 there is shown an example deployment of embodiments. In this example encoder processing is implemented on a content creator machine 1101 where content is encoded to a bitstream 1102. The bitstream 1102 is uploaded to a server 1105, from where it is downloaded or streamed to consumer (end user) clients 1107. End users 1107 consume the content with their devices such as mobile phones, wrist watches, computers, headphones, AR headsets, TVs, smart speakers etc. For 6DoF rendering, the end user device 1107 is a listener position tracking capable apparatus, which then provides the listener position to the renderer. The renderer device receives the bitstream 1102, decodes it, and renders the audio output to the user depending on user position. If the content is AR content, the renderer device performs environment scanning to provide environment information such as room geometry, reverberation characteristics or material information to the renderer.

In some embodiments the bitstream is communicated directly between elements such as shown between the server and listener device or via a cloud based network 1103 as shown between the content creator and the server.

Figure 12:
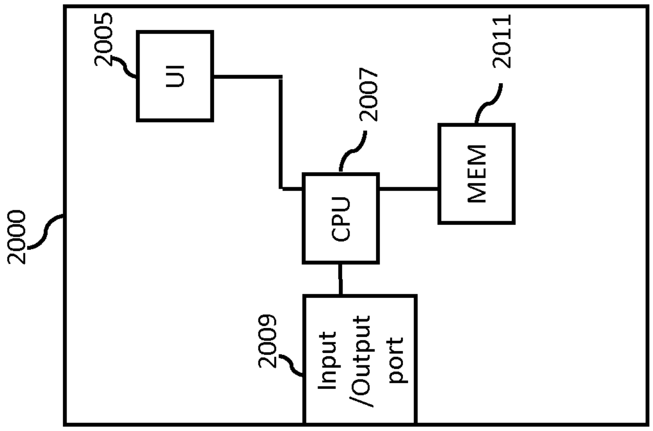
FIG. 12 shows an example device suitable for implementing the apparatus shown in previous figures.

With respect to FIG. 12 an example electronic device which may be used as any of the apparatus parts of the system as described above. The device may be any suitable electronics device or apparatus. For example in some embodiments the device 2000 is a mobile device, user equipment, tablet computer, computer, audio playback apparatus, etc. The device may for example be configured to implement the encoder or the renderer or any functional block as described above.

In some embodiments the device 2000 comprises at least one processor or central processing unit 2007. The processor 2007 can be configured to execute various program codes such as the methods such as described herein.

In some embodiments the device 2000 comprises a memory 2011. In some embodiments the at least one processor 2007 is coupled to the memory 2011. The memory 2011 can be any suitable storage means. In some embodiments the memory 2011 comprises a program code section for storing program codes implementable upon the processor 2007. Furthermore in some embodiments the memory 2011 can further comprise a stored data section for storing data, for example data that has been processed or to be processed in accordance with the embodiments as described herein. The implemented program code stored within the program code section and the data stored within the stored data section can be retrieved by the processor 2007 whenever needed via the memory-processor coupling.

In some embodiments the device 2000 comprises a user interface 2005. The user interface 2005 can be coupled in some embodiments to the processor 2007. In some embodiments the processor 2007 can control the operation of the user interface 2005 and receive inputs from the user interface 2005. In some embodiments the user interface 2005 can enable a user to input commands to the device 2000, for example via a keypad. In some embodiments the user interface 2005 can enable the user to obtain information from the device 2000. For example the user interface 2005 may comprise a display configured to display information from the device 2000 to the user. The user interface 2005 can in some embodiments comprise a touch screen or touch interface capable of both enabling information to be entered to the device 2000 and further displaying information to the user of the device 2000. In some embodiments the user interface 2005 may be the user interface for communicating.

In some embodiments the device 2000 comprises an input/output port 2009. The input/output port 2009 in some embodiments comprises a transceiver. The transceiver in such embodiments can be coupled to the processor 2007 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The input/output port 2009 may be configured to receive the signals.

In some embodiments the device 2000 may be employed as at least part of the renderer. The input/output port 2009 may be coupled to headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for processing at least one immersive audio signal, the at least one immersive audio signal comprising at least one audio signal associated with a sound source, at least one sound source parameter defining the sound source and at least one scene parameter for acoustically defining a six degrees of freedom audio scene within which the sound source is located, the apparatus comprising:

at least one processor; and at least one memory storing instructions that, when executed with the at least one processor, cause the apparatus at least to:

obtain the at least one audio signal associated with the sound source;

obtain the at least one sound source parameter defining the sound source;

obtain the at least one scene parameter for acoustically defining the six degrees of freedom audio scene within which the sound source is located;

determine information, for the sound source, about disabling of a time-varying propagation delay;

determine at least one early reverberation parameter based, at least partially, on the information; and render the at least one audio signal based on the at least one early reverberation parameter.

2. The apparatus as claimed in claim 1, wherein the information comprises at least one of:

an indication of the time-varying propagation delay; or a propagation delay value.

3. The apparatus as claimed in claim 1, wherein the instructions, when executed with the at least one processor, cause the apparatus to determine a control of propagation delay processing based on the information.

4. The apparatus as claimed in claim 3, wherein the instructions, when executed with the at least one processor, cause the apparatus to:

control processing of the time-varying propagation delay for the at least one audio signal based on the determined control of propagation delay processing.

5. The apparatus as claimed in claim 1, wherein the instructions, when executed with the at least one processor, cause the apparatus to:

disable early reverberation based processing of the at least one audio signal; and enable late reverberation based processing of the at least one audio signal, wherein the late reverberation based processing of the at least one audio signal comprises an enabled startup phase.

6. The apparatus as claimed in claim 5, wherein the instructions, when executed with the at least one processor, cause the apparatus to:

obtain a dimension of the six degrees of freedom audio scene based on the at least one scene parameter;

determine at least one time delay for at least one reflection path based on the dimension of the six degrees of freedom audio scene; and generate reverberation audio signals based on application of the at least one time delay to at least part of the at least one audio signal associated with the sound source.

7. The apparatus as claimed in claim 1, wherein the instructions, when executed with the at least one processor, cause the apparatus to:

enable early reverberation based processing of the at least one audio signal based on the at least one early reverberation parameter using a static propagation delay value, a static sound level value and a static direction of arrival value; and enable late reverberation based processing of the at least one audio signal.

8. The apparatus as claimed in claim 7, wherein the instructions, when executed with the at least one processor, cause the apparatus to:

determine a position of the sound source based on the at least one sound source parameter;

obtain a dimension of the six degrees of freedom audio scene based on the at least one scene parameter;

determine the static propagation delay value, the static sound level value and the static direction of arrival value for a reflection path based on the dimension of the six degrees of freedom audio scene and the position of the sound source; and generate early reverberation audio signals based on application of the static propagation delay value, the static sound level value and the static direction of arrival value to at least part of the at least one audio signal associated with the sound source.

9. The apparatus as claimed in claim 1, wherein the instructions, when executed with the at least one processor, cause the apparatus to:

enable early reverberation based processing of the at least one audio signal based on the at least one early reverberation parameter using a static propagation delay value, a static sound level value, and a time varying direction of arrival value; and enable late reverberation based processing of the at least one audio signal.

10. The apparatus as claimed in claim 9, wherein the instructions, when executed with the at least one processor, cause the apparatus to:

determine a static position of the sound source based on the at least one sound source parameter, and a time-varying position of the sound source based on at least one of the at least one sound source parameter or a time-varying position of a listener;

obtain a dimension of the six degrees of freedom audio scene based on the at least one scene parameter;

determine the static propagation delay value, and the static sound level value for a reflection path based on the dimension of the six degrees of freedom audio scene and the static position of the sound source;

determine the time-varying direction of arrival value for the reflection path based on the dimension of the six degrees of freedom audio scene and at least one of the time-varying position of the sound source or the time-varying position of the listener; and generate early reverberation audio signals based on application of the static propagation delay value, the static sound level value and the time-varying direction of arrival value to at least part of the at least one audio signal associated with the sound source.

11. The apparatus as claimed in claim 1, wherein the instructions, when executed with the at least one processor, cause the apparatus to:

enable early reverberation based processing of the at least one audio signal based on the at least one early reverberation parameter using a time-varying propagation delay value, a time-varying sound level value, and a time-varying direction of arrival value; and enable late reverberation based processing of the at least one audio signal.

12. The apparatus as claimed in claim 11, wherein the instructions, when executed with the at least one processor, cause the apparatus to:

determine a time-varying position of the sound source based on at least one of the at least one sound source parameter or a time-varying position of a listener;

obtain a dimension of the six degrees of freedom audio scene based on the at least one scene parameter;

determine the time-varying propagation delay value, the time-varying sound level value, and the time-varying direction of arrival value for a reflection path based on the dimension of the six degrees of freedom audio scene and at least one of the time-varying position of the sound source or the time-varying position of the listener;

generate early reverberation audio signals based on application of the time-varying propagation delay value, the time-varying sound level value, and the time-varying direction of arrival value to at least part of the at least one audio signal associated with the sound source; and further phase modify the early reverberation audio signals.

13. The apparatus as claimed in claim 12, wherein the instructions, when executed with the at least one processor, cause the apparatus to decorrelate process the early reverberation audio signals.

14. The apparatus as claimed in claim 1, wherein the instructions, when executed with the at least one processor, cause the apparatus to obtain at least one of:

at least one scene geometry parameter; or at least one scene acoustic material parameter.

15. The apparatus as claimed in claim 1, wherein the instructions, when executed with the at least one processor, cause the apparatus to obtain the at least one scene parameter from at least one of:

an encoder input format description;

a content creator;

an augmented reality sensing apparatus;

a camera; or a light ranging and detection sensor.

16. The apparatus as claimed in claim 1, wherein the instructions, when executed with the at least one processor, cause the apparatus to:

determine at least one of:

information indicating, for the sound source, a disabling of dynamic source updating;

a flag within the at least one immersive audio signal indicating the disabling of the dynamic source updating;

information within an application programming interface indicating the disabling of the dynamic source updating for the sound source; or a quality determiner configured to determine a lowering of quality of an output audio signal when the sound source is processed with the dynamic source updating.

17. The apparatus as claimed in claim 1, wherein the instructions, when executed with the at least one processor, cause the apparatus to:

perform a disabling of the time-varying propagation delay.

18. A method for an apparatus for processing at least one immersive audio signal, the at least one immersive audio signal comprising at least one audio signal associated with a sound source, at least one sound source parameter defining the sound source and at least one scene parameter for acoustically defining a six degrees of freedom audio scene within which the sound source is located, the method comprising:

obtaining the at least one audio signal associated with the sound source;

obtaining the at least one sound source parameter defining the sound source;

obtaining the at least one scene parameter for acoustically defining the six degrees of freedom audio scene within which the sound source is located;

determining information, for the sound source, about disabling of a time-varying propagation delay;

determining at least one early reverberation parameter based, at least partially, on the information; and rendering the at least one audio signal based on the at least one early reverberation parameter.

19. A non-transitory computer readable medium comprising instructions that, when executed with an apparatus, cause the apparatus to perform processing of at least one immersive audio signal, the at least one immersive audio signal comprising at least one audio signal associated with a sound source, at least one sound source parameter defining the sound source and at least one scene parameter for acoustically defining a six degrees of freedom audio scene within which the sound source is located, and cause the apparatus to perform at least the following:

obtaining the at least one audio signal associated with the sound source;

obtaining the at least one sound source parameter defining the sound source;

obtaining the at least one scene parameter for acoustically defining the six degrees of freedom audio scene within which the sound source is located;

determining information, for the sound source, about disabling of a time-varying propagation delay;

determining at least one early reverberation parameter based, at least partially, on the information; and rendering the at least one audio signal based on the at least one early reverberation parameter.

* * * * *